US010962803B2

(12) United States Patent
Zhang et al.

(10) Patent No.: US 10,962,803 B2
(45) Date of Patent: Mar. 30, 2021

(54) CONTACT LENSES WITH A LUBRICIOUS COATING THEREON

(71) Applicant: Novartis AG, Basel (CH)

(72) Inventors: Steve Yun Zhang, Sugar Hill, GA (US); Daqing Wu, Suwanee, GA (US); Richard Charles Breitkopf, Dunwoody, GA (US); Weihong Lang, Suwanee, GA (US); Junhao Ge, Johns Creek, GA (US); Maria F. Gubitosi Raspino, Liburn, GA (US); Frank Chang, Cumming, GA (US); Thomas M. Moy, Cumming, GA (US); Troy Vernon Holland, Suwanee, GA (US)

(73) Assignee: Alcon Inc., Fribourg (CH)

( * ) Notice: Subject to any disclaimer, the term of this patent is extended or adjusted under 35 U.S.C. 154(b) by 177 days.

(21) Appl. No.: 16/260,544

(22) Filed: Jan. 29, 2019

(65) Prior Publication Data
US 2019/0235277 A1 Aug. 1, 2019

Related U.S. Application Data

(60) Provisional application No. 62/623,585, filed on Jan. 30, 2018.

(51) Int. Cl.
G02B 1/04 (2006.01)
G02C 7/04 (2006.01)
C09D 143/00 (2006.01)
C08F 230/00 (2006.01)
C08J 7/04 (2020.01)

(52) U.S. Cl.
CPC ............ *G02C 7/049* (2013.01); *C08F 230/00* (2013.01); *C08J 7/0427* (2020.01); *C09D 143/00* (2013.01); *G02B 1/043* (2013.01); *C08J 2329/14* (2013.01); *C08J 2443/00* (2013.01); *G02B 1/04* (2013.01)

(58) Field of Classification Search
CPC ..................................................... G02B 1/043
See application file for complete search history.

(56) References Cited

U.S. PATENT DOCUMENTS

| 3,408,429 A | 10/1968 | Wichterle |
| 4,347,198 A | 8/1982 | Ohkada et al. |
| 4,721,760 A | 1/1988 | Graafland |
| 5,508,317 A | 4/1996 | Mueller |
| 5,583,163 A * | 12/1996 | Muller .................. B29C 31/041 522/152 |
| 5,583,463 A | 12/1996 | Merritt |
| 5,789,464 A | 8/1998 | Mueller |
| 5,849,810 A | 12/1998 | Mueller |
| 6,303,687 B1 | 10/2001 | Mueller |
| 6,596,267 B1 | 7/2003 | Hubbell |
| 6,627,124 B1 | 9/2003 | Herbrechtsmeier et al. |
| 6,800,225 B1 | 10/2004 | Hagmann et al. |
| 6,958,169 B2 | 10/2005 | Kuenzler |
| 7,029,688 B2 | 4/2006 | Hubbell |
| 7,384,590 B2 | 6/2008 | Kelly et al. |
| 7,387,759 B2 | 6/2008 | Kelly et al. |
| 7,988,988 B2 | 8/2011 | Valint, Jr. |
| 8,088,313 B2 | 1/2012 | Hagmann et al. |
| 8,419,792 B2 | 4/2013 | Vanderbilt |
| 8,534,031 B2 | 9/2013 | Mcgee |
| 8,631,631 B2 | 1/2014 | Vanderbilt |
| 8,668,736 B2 | 3/2014 | Vanderbilt |
| 8,703,025 B2 * | 4/2014 | Cocora ............ B29D 11/00317 264/2.7 |
| 8,802,075 B2 | 8/2014 | Cooper |
| 9,005,596 B2 | 4/2015 | Cooper |
| 9,244,196 B2 | 1/2016 | Scales |
| 9,283,248 B2 | 3/2016 | Cooper |
| 9,295,693 B2 | 3/2016 | Cooper |
| 9,297,929 B2 | 3/2016 | Scales |
| 9,625,617 B2 | 4/2017 | Scales |
| 9,726,906 B2 | 8/2017 | Scales |
| 2005/0203256 A1 | 9/2005 | Destarac |
| 2006/0106178 A1 | 5/2006 | Destarac |

(Continued)

FOREIGN PATENT DOCUMENTS

| CN | 2271719 Y | 12/1997 |
| CN | 100337696 C | 9/2007 |

(Continued)

OTHER PUBLICATIONS

Asoh, et al., "Adhesion of poly(vinyl alcohol) hydrogels by the electrophoretic manipulation of phenylboronic acid copolymers", Sep. 7, 2015, pp. 6740-6745, vol. 3, No. 33, Journal of Materials Chemistry B.

Bull, et al., "Exploiting the Reversible Covalent Bonding of Boronic Acids: Recognition, Sensing, and Assembly", Feb. 19, 2013, pp. 312-326, vol. 46, No. 2, Accounts of Chemical Research.

Cambre, et al., "Biomedical applications of boronic acid polymers", Sep. 29, 2011, vol. 52, No. 21, Polymer.

(Continued)

Primary Examiner — Michael F Pepitone
(74) Attorney, Agent, or Firm — Jian Zhou

(57) ABSTRACT

The invention is generally related to a soft contact lens which comprises a hydrogel lens body and a coating of a hydrophilic copolymer thereon and to a method for producing the same. The hydrogel lens body comprises or is made of a polymeric material having 1,2- and/or 1,3-diol moieties, and the hydrophilic copolymer comprises arylborono-containing repeating units each having a boronic acid group. The coating is covalently-attached to the hydrogel lens body through cyclic boronic ester linkages each formed between one boronic acid group and one 1,2-diol or 1,3-diol group. The soft contact lens has a surface lubricity higher than the surface lubricity of the lens body.

32 Claims, No Drawings

(56) References Cited

U.S. PATENT DOCUMENTS

| | | |
|---|---|---|
| 2008/0151181 A1 | 6/2008 | Vanderbilt |
| 2009/0306297 A1 | 12/2009 | Destarac |
| 2010/0029853 A1 | 2/2010 | Destarac |
| 2010/0168851 A1* | 7/2010 | Vanderbilt .............. G02B 1/043 623/6.62 |
| 2010/0168855 A1* | 7/2010 | McGee .................. A61L 27/34 623/11.11 |
| 2012/0172486 A1* | 7/2012 | Zhu ........................... C08J 7/16 523/106 |
| 2012/0194779 A1* | 8/2012 | Zhang ........................ C08J 7/16 351/159.33 |
| 2012/0264214 A1 | 10/2012 | Carlson |
| 2016/0206565 A1 | 7/2016 | Cooper |
| 2016/0243156 A1 | 8/2016 | Cooper |
| 2017/0166673 A1 | 6/2017 | Huang |

FOREIGN PATENT DOCUMENTS

| | | |
|---|---|---|
| CN | 102395378 A | 3/2012 |
| CN | 104321356 A | 1/2015 |
| CN | 104350076 A | 2/2015 |
| EP | 0389632 A1 | 10/1990 |
| EP | 1009451 B1 | 10/2003 |
| EP | 1504039 A1 | 2/2005 |
| EP | 1926761 A1 | 6/2008 |
| EP | 1572261 B1 | 7/2008 |
| EP | 2370113 B1 | 12/2013 |
| EP | 2855545 A1 | 4/2015 |
| EP | 2855547 A2 | 4/2015 |
| EP | 2855546 B1 | 7/2016 |
| EP | 2398499 B1 | 9/2017 |
| JP | H04-503825 A | 7/1992 |
| TW | 201733779 A | 10/2017 |
| WO | 02/071106 A1 | 9/2002 |
| WO | WO03095502 A1 | 11/2003 |
| WO | WO2006125892 A1 | 11/2006 |
| WO | WO2010077708 A1 | 7/2010 |
| WO | WO2010078107 A1 | 7/2010 |
| WO | WO2011037893 A2 | 3/2011 |
| WO | WO2011037897 A2 | 3/2011 |
| WO | WO2012118686 A2 | 9/2012 |

OTHER PUBLICATIONS

Hall, "Structure, Properties, and Preparation of Boronic Acid Derivatives. Overview of Their Reactions and Applications", In: Boronic Acids. Ed. Hall, 2005, pp. 1-99, Wiley-VCH Verlag GmbH & Co. KGaA, Weinheim.

Konno, et al., "Temporal and spatially controllable cell encapsulation using a water-soluble phospholipid polymer with phenylboronic acid moiety", Apr. 2007, pp. 1770-1777, vol. 28, No. 10, Biomaterials.

Lin, et al., "The role of the disulfide group in disulfide-based polymeric gene carriers", Apr. 22, 2009, vol. 6, No. 4, Expert Opinion on Drug Delivery.

Martinez-Aguirre, et al., "Substituent Effects and pH Profiles for Stability Constants of Arylboronic Acid Diol Esters", May 17, 2013, pp. 4674-4684, vol. 78, No. 10, Journal of Organic Chemistry.

Peters, "Interactions between boric acid derivatives and saccharides in aqueous media: Structures and stabilities of resulting esters", Jun. 1, 2014, pp. 1-22, vol. 268, Coordination Chemistry Reviews.

Springsteen, et al., "A detailed examination of boronic acid-diol complexation", Jun. 24, 2002, pp. 5291-5300, vol. 58, No. 26, Tetrahedron.

Vancoillie, et al., "Synthesis and polymerization of boronic acid containing monomers", Sep. 21, 2016, pp. 5484-5495, vol. 7, No. 35, Polymer Chemistry.

Xu, et al., "The biological performance of cell-containing phospholipid polymer hydrogels in bulk and microscale form", Dec. 2010, pp. 8839-8846, vol. 31, No. 34, Biomaterials.

Zhang, et al., "Controlling the Assembly of Nanoparticle Mixtures With Two Orthogonal Polymer Complexation Reactions", Feb. 14, 2012, pp. 3112-3119, vol. 28, No. 6, Langmuir.

\* cited by examiner

CONTACT LENSES WITH A LUBRICIOUS COATING THEREON

This application claims the benefit under 35 USC § 119 (e) of U.S. provisional application No. 62/623,585, filed on 30 Jan. 2018, incorporated by reference in its entirety.

This invention is related to soft contact lenses each having a lubricious coating thereon. In addition, the invention provides a method for making such contact lenses, an aqueous solution for forming lubricious coatings on hydrogel contact lenses, and to ophthalmic products containing soft contact lenses of the invention.

BACKGROUND

Most commercially-available non-silicone hydrogel contact lenses are produced according to a conventional cast molding technique involving use of disposable plastic molds and a mixture of vinylic monomers and crosslinking agents. There are several disadvantages with the conventional cast-molding technique. For example, a traditional cast-molding manufacturing process often includes lens extraction in which unpolymerized monomers must be removed from the lenses by using an organic solvent. Use of organic solvents can be costly and is not environmentally friendly. In addition, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

The above described disadvantages encountered in a conventional cast-molding technique can be overcome by using the so-called Lightstream Technology™ (Alcon), which involves (1) a lens-forming composition being substantially free of monomers and comprising a substantially-purified, water-soluble polyvinylalcohol prepolymer with ethylenically-unsaturated groups, (2) reusable molds produced in high precision, and (3) curing under a spatial limitation of actinic radiation (e.g., UV or visible light), as described in U.S. Pat. Nos. 5,508,317, 5,583,163, 5,789,464, 5,849,810, 6,800,225, and 8,088,313. Non-silicone hydrogel Lenses produced according to the Lightstream Technology™, for example, DAILIES® AquaComfort Plus®, can have high consistency and high fidelity to the original lens design, because of use of reusable, high precision molds. In addition, contact lenses with high optical quality can be produced at relatively lower cost due to the short curing time, a high production yield, and free of lens extraction and in an environmentally friendly manner because of use of water as solvent for preparing lens formulations. However, although DAILIES@ AquaComfort Plus® lenses have a good optical quality and a good surface wettability, they may not have a desired surface lubricity for ensuring a superior wearing comfort.

Therefore, there are still needs for a new hydrogel contact lens, in particular, a PVA-based hydrogel contact lens, having a superior surface lubricity and for a method capable of producing such contact lenses.

SUMMARY

In one aspect, the invention provides a soft contact lens which comprises a hydrogel lens body and a coating thereon, wherein the hydrogel lens body comprises or is made of a polymeric material having 1,2- and/or 1,3-diol moieties, wherein the coating comprises a layer of a hydrophilic copolymer comprising (a) arylborono-containing repeating units each having a boronic acid group and (b) repeating units of at least one hydrophilic vinylic monomer, wherein the coating is covalent attached onto the hydrogel lens body through linkages each formed between one of the boronic acid groups of the hydrophilic copolymer and one of the 1,2-diol and 1,3-diol moieties of the polymeric material. The soft contact lens has a surface lubricity better than the surface lubricity of the hydrogel lens body.

In another aspect, the invention provides a method for producing soft contact lenses, comprising the steps of: (1) obtaining a preformed hydrogel contact lens, wherein the preformed hydrogel contact lens comprises or is made of a polymeric material having 1,2- and/or 1,3-diol moieties; (2) contacting the preformed hydrogel contact lens with an aqueous solution of a hydrophilic copolymer which comprises (a) arylborono-containing repeating units each having a boronic acid and (b) repeating units of at least one hydrophilic vinylic monomer, for a time period to covalently attach a layer (or coating) of the hydrophilic copolymer onto the preformed hydrogel contact lens through linkages each formed between one of the boronic acid groups of the hydrophilic copolymer and one of the 1,2-diol and 1,3-diol moieties of the polymeric material.

In also another aspect, the invention provides an aqueous solution for treating, storing or packaging a hydrogel contact lens comprising or made of a polymeric material comprising 1,2-diol and 1,3-diol moieties, the aqueous solution comprising one or more buffering agents in an amount sufficient to maintain a pH of from about 6 to about 8 and a hydrophilic copolymer which comprises (a) arylborono-containing repeating units each having a boronic acid and (b) repeating units of at least one hydrophilic vinylic monomer, wherein the hydrophilic copolymer is capable of being covalently attached onto the hydrogel contact lens through linkages each formed between one of the boronic acid groups of the hydrophilic copolymer and one of the 1,2-diol and 1,3-diol moieties of the polymeric material, thereby forming a layer or coating of the hydrophilic copolymer on the hydrogel contact lens.

In a further aspect, the invention provides an ophthalmic product, comprising a sealed and sterilized package which includes a packaging solution and a soft hydrogel contact lens which has been immersed and autoclaved in the packaging solution in the sealed package, wherein the packaging solution has a pH of from about 6.0 to about 8.0, a tonicity of from about 200 to about 450 mOsm/kg, and a viscosity of up to about 5.0 centipoises at 25° C., wherein the soft contact lens comprises a hydrogel lens body and a coating thereon, wherein the hydrogel lens body comprises or is made of a polymeric material having 1,2-diol and 1,3-diol moieties, wherein the coating comprises a layer of a hydrophilic copolymer comprising (a) arylborono-containing repeating units each having a boronic acid group and (b) repeating units of at least one hydrophilic vinylic monomer, wherein the coating is covalent attached onto the hydrogel lens body through linkages each formed between one of the boronic acid groups of the hydrophilic copolymer and one of the 1,2-diol and 1,3-diol moieties of the polymeric material.

DETAILED DESCRIPTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references.

Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

A "contact Lens" refers to a structure that can be placed on or within a wearer's eye. A contact lens can correct, improve, or alter a user's eyesight, but that need not be the case.

A "soft contact lens" refers to a contact lens which has an elastic modulus (i.e., Young's modulus) of less than 2.5 MPa.

As used in this application, the term "hydrogel lens body" or "bulk material" in reference to a soft contact lens interchangeably means a layer of a hydrogel material that has a 3-dimensional shape of a soft contact lens and includes a central curved plane (which divides the contact lens into two parts, one containing the anterior surface and the other containing the posterior surface) and has a variable thickness.

As used in this application, the term "hydrogel" or "hydrogel material" refers to a crosslinked polymeric material which is insoluble in water, but can hold at least 10 percent by weight of water in its three-dimensional polymer networks (i.e., polymer matrix) when it is fully hydrated. A hydrogel material can be a non-silicone hydrogel material (which is theoretically free of any silicone) or a silicone hydrogel material (which is a hydrogel material containing silicone).

A "vinylic monomer" refers to a compound that has one sole ethylenically-unsaturated group.

The term "soluble", in reference to a compound or material in a solvent, means that the compound or material can be dissolved in the solvent to give a solution with a concentration of at least about 0.1% by weight at room temperature (i.e., from about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "ethylenically unsaturated group" is employed herein in a broad sense and is intended to encompass any groups containing at least one >C=C< group. Exemplary ethylenically unsaturated groups include without limitation (meth)acryloyl

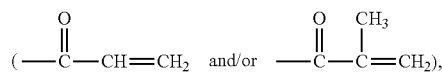

allyl, vinyl (—CH=CH$_2$), 1-methylethenyl

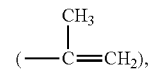

styrenyl, or the likes.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

An "acrylic monomer" refers to a vinylic monomer having one sole (meth)acryloyl group.

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "vinylic crosslinker" refers to a compound having at least two ethylenically unsaturated groups. A "vinylic crosslinking agent" refers to a vinylic crosslinker having a molecular weight of about 700 Daltons or less.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene divalent radical" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. A alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "arylborono-containing vinylic monomer" refers to a vinylic monomer which comprises one sole arylborono group linked to its sole ethylenically unsaturated group through one linkage.

In this application, an "arylborono" group refers to a substituted phenyl group having one boronic acid group (i.e., —B(OH)$_2$) and optionally one or more other groups as substituents each of which replaces one hydrogen atom of the phenyl group.

As used in this application, the term "phosphorylcholine" refers to a monovalent zwitterionic group of

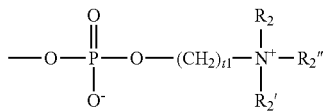

in which t1 is an integer of 1 to 5 and $R_2$, $R_2'$ and $R_2''$ independently of one another are $C_1$-$C_8$ alkyl or $C_1$-$C_8$ hydroxyalkyl.

An "initiator" refers to a chemical that can initiate free radical crosslinking/polymerizing reaction.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6). The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

In general, the invention is directed to a method for producing soft contact lenses each of which comprises a hydrogel lens body, which comprises or is made of a polymeric material having 1,2- and/or 1,3-diol moieties (e.g., a crosslinked polyvinylalcohol or a polymeric material comprising diol-containing repeating units each having a 1,2- or 1,3-diol), and a covalently-attached lubricious coating on the hydrogel lens body; and to such soft contact lenses. The invention is partly based on the discovery that such a hydrogel contact lens (e.g., a polyvinylalcohol-based hydrogel contact lens) can be coated with a hydrophilic copolymer having arylborono-containing repeating units each capable of reacting with one of 1,2-diol or 1,3-diol moieties in the hydrogel lens body to form one reversible covalent bonding (i.e., cyclic boronic ester linkage), as illustrated in Scheme I, to attach a layer (or coating) of the hydrophilic copolymer onto the surface of a hydrogel contact lens, in a water-based coating process. The formed cyclic boronic ester linkages can be stable in a sealed and autoclaved lens package in the pH range of a typical lens packaging solution. Resultant hydrogel contact lenses with a coating of the hydrophilic copolymer thereon can enhance the surface lubricity of the hydrogel contact lens. It is further discovered that the water-based coating process has no or minimal impact on the properties of the preformed hydrogel contact lens (e.g., a preformed polyvinylalcohol-based hydrogel contact lens) so as to maintain all the beneficial attributes of the preformed hydrogel contact lens (e.g., the preformed polyvinylalcohol-based hydrogel contact lens), for example, such as, softness, equilibrium water content, elongation, etc.

Scheme I

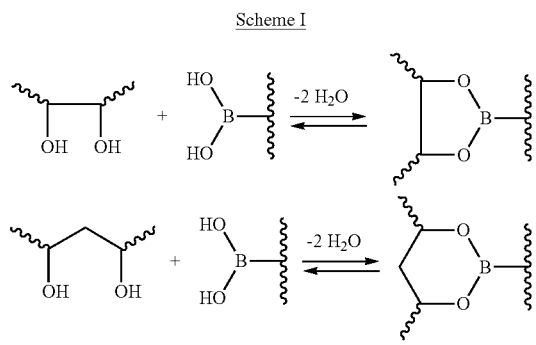

In one aspect, the invention provides a method for producing soft contact lenses, comprising the steps of: (1) obtaining a preformed hydrogel contact lens, wherein the preformed hydrogel contact lens comprises or is made of a polymeric material having 1,2- and/or 1,3-diol moieties; (2) contacting the preformed hydrogel contact lens with an aqueous solution of a hydrophilic copolymer which comprises (a) arylborono-containing repeating units each having a boronic acid and (b) repeating units of at least one hydrophilic vinylic monomer, for a time period to covalently attach a layer (or coating) of the hydrophilic copolymer onto the preformed hydrogel contact lens through linkages each formed between one of the boronic acid groups of the hydrophilic copolymer and one of the 1,2-diol and 1,3-diol moieties of the polymeric material.

Any suitable preformed hydrogel contact lenses can be used in the invention, so long as they comprises or is made of a polymeric material having 1,2- and/or 1,3-diol moieties. In one preferred embodiment, a preformed hydrogel contact lens comprises or is made of a polymeric material comprising at least 50% by mole (preferably at least 60% by mole, more preferably at least 70% by mole, even more preferably at least 75% by mole of repeating units of vinyl alcohol. In another preferred embodiment, a preformed hydrogel contact lens comprises or is made of a polymeric material that comprises at least one type of diol-containing repeating units each having one or more 1,2- and/or 1,3-diol moieties and has at least 5% (preferably at least 10%, more preferably at least 15%, even more preferably at least 20%) by repeating-unit-equivalent of 1,2- and 1,3-diol moieties.

In accordance with the invention, the repeating-unit-equivalent percentage ($E_{RU}^{diol}$) of the 1,2- and 1,3-diol moieties can be calculated according the following equation $$E_{RU}^{diol} = \sum_{i}^{n} (X_i^{diol} \times N_i^{diol})$$

in which "n" is the total number of different types of diol-containing repeating units, $X_i^{diol}$ is the mole percentage of one specific type, "i", of diol-containing repeating units, $N_i^{diol}$ is the number of 1,2-diols and 1,3-diols in each of type i of the repeating units.

In accordance with the invention, the mole percentages of each type of repeating units in the polymeric material of a hydrogel contact lens can be determined based on the mole percentage of a vinylic monomer or crosslinker, from which this type of repeating units are derived in polymerization, in a lens-forming composition for forming the hydrogel contact lens.

In accordance with the invention, a preformed hydrogel contact lens is a contact lens that has not been subjected to any surface modification posterior to the lens-forming process well known to a person skilled in the art. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses. In a cast-molding process, a lens formulation typically is dispensed into disposable or reusable molds and cured (i.e., polymerized and/or crosslinked) in the molds for making contact lenses.

For production of preformed hydrogel contact lenses to be used in the invention, a hydrogel lens formulation (composition) comprises all necessary polymerizable components known to a person skilled in the art and at least one free-radical initiator (photoinitiator or thermal initiator), so long as the hydrogel lens formulation (composition) must comprise at least one polymerizable component containing at least one 1,2- or 1,3-diol moiety. It should be understood that a hydrogel lens formulation can also contain other polymerizable or non-polymerizable components, such as, a lubricating agent (or so-called internal wetting agents incorporated in a lens formulation), a UV-absorbing agent, a visibility tinting agent (e.g., dyes, pigments, or mixtures thereof), antimicrobial agents (e.g., preferably silver nanoparticles), a bioactive agent, and combinations thereof.

Polymerizable components for making preformed hydrogel contact lenses are well known to a person skilled in the art. Typically, a hydrogel lens formulation for making contact lenses comprises polymerizable components selected from the group consisting of one or more hydrophilic vinylic monomers, one or more hydrophobic vinylic monomers, one or more silicone-containing vinylic monomers, one or more vinylic crosslinkers/crosslinking agents, one or more ethylenically-crosslinkable prepolymers, and combinations thereof.

Resultant preformed hydrogel contact lenses then can be subjected to extraction with an extraction solvent to remove unpolymerized components from the resultant lenses, to hydration process, and to other post-molding processes, as known by a person skilled in the art.

In a preferred embodiment, a preformed hydrogel contact lens is a polyvinylalcohol-based hydrogel contact lens is preferably obtained by polymerizing a water-soluble, actinically-crosslinkable polyvinyl alcohol prepolymer, comprising:

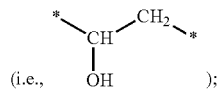

(i.e., $\overset{|}{\text{OH}}$);

repeating units of vinyl alcohol (i.e., OH);
repeating units of formula (I); and

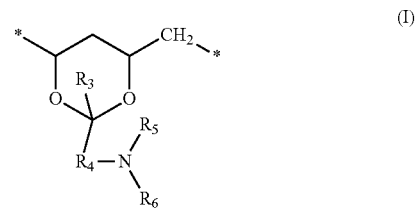

in which:
R₃ can be hydrogen or a $C_1$-$C_{06}$ alkyl group (preferably hydrogen);
R₄ is a $C_1$-$C_{06}$ alkylene divalent radical (preferably a $C_1$-$C_4$ alkylene divalent radical, more preferably methylene or butylene divalent radical, even more preferably methylene divalent radical);
R₅ is hydrogen or $C_1$-$C_{06}$ alkyl (preferably hydrogen or $C_1$-$C_4$ alkyl, more preferably hydrogen or methyl or ethyl, even more preferably hydrogen or methyl);
R₆ is an ethylenically unsaturated group of

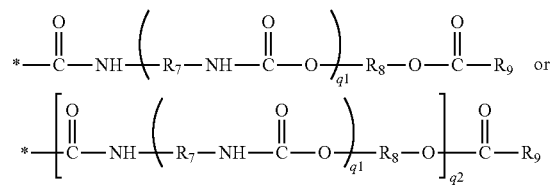

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

In another preferred embodiment, wherein $R_4$ is methylene divalent radical, $R_5$ is H or $C_1$-$C_4$ alkyl, $R_3$ is H, and $R_6$ is a radical of

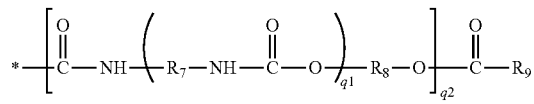

in which q2 is zero, $R_9$ is vinyl (*—CH=CH$_2$) or 1-methylethenyl (*—C(CH$_3$)=CH$_2$).

In another preferred embodiment, the polyvinylalcohol prepolymer has a weight average molecular weight of at least about 2,000 Daltons, and comprises from about 1% to about 25% by mole, preferably from about 2% to about 15% by mole of the repeating units of formula (I).

A water-soluble, actinically-crosslinkable polyvinylalcohol prepolymer can be prepared using techniques known in the art, e.g., those disclosed in U.S. Pat. Nos. 5,583,163 and 6,303,687.

Preferably, the polyvinylalcohol prepolymers are purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents.

The preferred purification process, ultrafiltration, an be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

It would be advantageous that the water-soluble actinically-crosslinkable polyvinylalcohol prepolymers are in a substantially pure form (e.g., purified by ultrafiltration to remove most reactants for forming the prepolymer). Therefore, after crosslinking by actinic radiation, a contact lens may require practically no more subsequent purification, such as in particular complicated extraction of unpolymerized constituents. Furthermore, crosslinking may take place in aqueous solution, so that a subsequent solvent exchange or the hydration step is not necessary.

Preferably, a preformed polyvinylalcohol-based hydrogel contact lens is obtained by: introducing an aqueous lens-forming composition including a water-soluble, actinically-crosslinkable polyvinyl alcohol prepolymer described above into a reusable mold and curing under a spatial limitation of actinic radiation the aqueous lens-forming composition.

Preferably, a reusable mold suitable for spatial limitation of radiation is used in the invention, the projected beam of radiation (e.g., radiation from the light source including the light in the region of 360 nm to 550 nm) limits radiation (e.g., UV/visible radiation) impinging on the mixture of the lens-forming materials located in the path of the projected beam from the first molding surface to the second molding surface of the reusable mold. The resultant contact lens comprises an anterior surface defined by the first molding surface, an opposite posterior surface defined by the second molding surface, and a lens edge (with sharp edge and high quality) defined by the sectional profile of the projected radiation beam (i.e., a spatial limitation of radiation). Examples of reusable molds suitable for spatial limitation of radiation include without limitation those disclosed in U.S. Pat. Nos. 6,627,124, 6,800,225, 7,384,590, and 7,387,759.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess mixture can flow into the gap. It is understood that gaps with any design can be used in the invention.

In a preferred embodiment, at least one of the first and second molding surfaces is permeable to a crosslinking radiation. More preferably, one of the first and second molding surfaces is permeable to a crosslinking radiation while the other molding surface is poorly permeable to the crosslinking radiation.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold cavity and surrounds the mold cavity so as to screen all areas behind the mask with the exception of the mold cavity.

The mask may preferably be a thin chromium layer, which can be formed according to processes as known, e.g., in photo and UV lithography. Other metals or metal oxides may also be suitable mask materials. The mask can also be coated with a protective layer, for example of silicon dioxide if the material used for the mold or mold half is quartz.

Alternatively, the mask can be a masking collar made of a material comprising a UV/visible light-absorber and substantially blocks curing energy therethrough as described in U.S. Pat. No. 7,387,759. In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a light-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

Reusable molds can be made of quartz, glass, sapphire, CaF$_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual molding surfaces, damage as a result of contact is ruled out. This ensures a high service life of the molds, which, in particular, also ensures high reproducibility of the contact lenses to be produced and high fidelity to the lens design.

In another preferred embodiment, a preformed hydrogel contact lens comprises or is made of a polymeric material that comprises at least one type of diol-containing repeating units each having one or more 1,2- and/or 1,3-diol moieties and has at least 5% (preferably at least 10%, more preferably at least 15%, even more preferably at least 20%) by repeating-unit-equivalent of 1,2- and 1,3-diol moieties. It is understood that diol-containing repeating units can be derived, in a polymerization, either from at least one diol-containing vinylic monomer having at least one 1,2-diol and/or 1,3-diol moiety or from at least one diol-containing vinylic crosslinker having at least one 1,2-diol and/or 1,3-diol moiety.

Any diol-containing vinylic monomers can be used in the invention, so long as they each comprise at least one 1,2-diol and/or 1,3-diol moiety. Examples of preferred diol-containing vinylic monomers include without limitation N-2,3-dihydroxypropyl (meth)acrylamide, N-tris(hydroxymethyl) methyl (meth)acrylamide, 2-gluconamidoethyl (meth) acrylamide, 3-gluconamidopropyl (meth)acrylamide, glycerol (meth)acrylate, glucosyl (meth)acrylate, glucosyloxyethyl (meth)acrylate, sugar acrylic monomers disclosed in U.S. Pat. Appl. Pub. No. 2012/0264214 and U.S. Pat. No. 4,721,760 and the likes, 3-allyoxy-1,2-propanediol, 2-allyloxymethyl-2-(hydroxymethyl)-1,3-propanediol, 2-allyloxymethyl-2-ethyl-1,3-propanediol (i.e., trimethylolpropaneallylether), allyl α-D-mannopyranoside, allyl α-D-galactopyranoside, allyl 6-deoxyhexopyranoside, allyl 6-deoxy-2-O-methylhexopyranoside, and combinations thereof.

Any diol-containing vinylic crosslinkers can be used in the invention, so long as they each comprise at least one 1,2-diol and/or 1,3-diol moiety. Examples of preferred diol-containing vinylic crosslinkers include without limitations N,N'-(1,2-dihydroxyethylene)bis-(meth)acrylamide, N,N'-(2,3-dihydroxybutylene)bis-(meth)acrylamide, those polydimethylsiloxane vinylic crosslinkers comprising siloxane units each having methyl substituent and one diol-containing substituent as disclosed in U.S. Pat. Appl. Pub. No. 2017/01666673, and combinations thereof.

In accordance with the invention, a hydrophilic copolymer for coating a hydrogel contact lens of the invention must be water soluble.

In a preferred embodiment, the hydrophilic copolymer comprises (a) from about 0.5% by mole to about 25% by mole (preferably from about 1% to about 20% by mole, more preferably from about 2% to about 18% by mole, even more preferably from about 3% to about 15% by mole) of arylborono-containing repeating units each having a boronic acid and (b) from about 75% by mole to about 99.5% by mole (preferably from about 80% to about 99% by mole, more preferably from about 82% to about 98% by mole, even more preferably from about 85% to about 97% by mole) of repeating units of at least one hydrophilic vinylic monomer, provided that the sum of the mole percentages of components (a) and (b) and other components not listed above is 100%.

In another preferred embodiment, the hydrophilic copolymer comprises (a) from about 1% to about 20% by mole (preferably from about 1% to about 20% by mole, more preferably from about 2% to about 15% by mole) of arylborono-containing repeating units each having a boronic acid, (b) from about 60% to about 98% by mole (preferably from about 60% to about 97% by mole, more preferably from about 70% to about 95% by mole) of repeating units of at least one phosphorylcholine-containing vinylic monomer, and (c) from about 1% by mole to about 20% by mole (preferably from about 2% to about 20% by mole, more preferably from about 3% to about 15% by mole) of acrylic monomeric units of at least one acrylic monomer having 3 to 16 (preferably 3 to 14, more preferably 3 to 12, even more preferably 3 to 10) carbon atoms, provided that the sum of the mole percentages of components (a), (b) and (c) and other components not listed above is 100%.

In accordance with the invention, the mole percentages of each type of repeating units (i.e., monomeric units) of a hydrophilic copolymer can be determined based on the mole percentage of a vinylic monomer, from which this type of repeating units are derived, in a polymerizable composition for forming the hydrophilic copolymer.

In accordance with the invention, each type of arylborono-containing repeating units can be derived directly from an arylborono-containing vinylic monomer, preferably from an arylborono-containing vinylic monomer of formula (II)

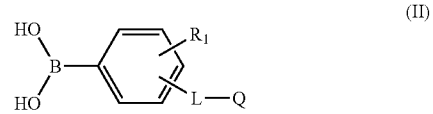

in which: $R_1$ is H, $NO_2$, F, Cl, or $CF_3$; Q is a monovalent radical of

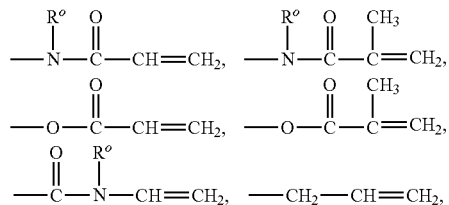

or $-CH=CH_2$; L is a direct bond, a $C_1$-$C_4$ alkylene divalent radical, a divalent radical of

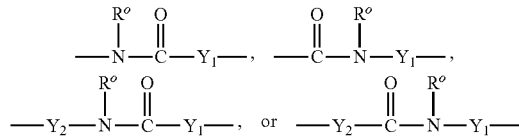

in which $Y_1$ is CH(OH) or a $C_1$-$C_4$ alkylene divalent radical, $Y_2$ is a $C_1$-$C_4$ alkylene divalent radical, and $R^o$ is H or a $C_1$-$C_4$ alkyl.

Examples of preferred arylborono-containing vinylic monomers of formula (II) include without limitation 3-vinylphenylboronic acid, 4-vinylboronic acid, 3-(meth)acrylamidophenylboronic acid, 4-(meth)acrylamidophenylboronic acid, a reaction production of an amino-containing phenylboronic acid derivative with (meth)acrylic acid halide, a reaction product of an amino-containing phenylboronic acid derivative with a carboxy-containing vinylic monomer in the presence of a carbodiimide (e.g., 1-ethyl- 3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide, a reaction production of a carboxy-containing phenylboronic acid derivative with an amino-containing vinylic monomer in the presence of a carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide, and combinations thereof.

Examples of preferred carboxy-containing phenylboronic acid derivatives include without limitation 3-carboxyphenylboronic acid, 4-carboxyphenylboronic acid, 3-boronophenylacetic acid, 4-boronophenylacetic acid, 2-(4-boronophenyl)-2-methylpropanoic acid, 3-(4-boronophenyl) propanoic acid, 3-(3-boronophenyl)propanoic acid, 5-(3-boronophenyl)pentanoic acid, 5-(4-boronophenyl)pentanoic acid, 4-(2-carboxyethyl)-3-nitrophenylboronic acid, 3-(3-carboxypropyonylamino)phenylboronic acid, 3-amino-3-(4-boronophenyl)propanoic acid, and combinations thereof.

Examples of preferred amino-containing phenylboronic acid derivatives include without limitation 3-aminophenylboronic acid, 4-aminophenylboronic acid, 4-amino-3-nitrophenylboronic acid, 4-amino-4-fluorophenylboronic acid, 2-(aminomethyl)-5-nitrophenylboronic acid, 3-(aminomethyl)-phenylboronic acid, 3-amino-5-nitrophenylboronic acid, 3-amino-3-(4-boronophenyl)propanoic acid, and combinations thereof.

Examples of preferred carboxy-containing vinylic monomer include without limitation 2-acrylamidoglycolic acid, 3-acrylamidopropionic acid, 4-acrylamidobutanoic acid, 5-acrylamidopentanoic acid, 3-acryloyloxypropanoic acid, 4-acryloyloxybutanoic acid, 5-acryloyloxypentanoic acid, and combinations thereof.

Examples of preferred amino-containing vinylic monomers include without limitation amino-$C_2$-$C_4$ alkyl (meth)acrylate, $C_1$-$C_3$ alkylamino-$C_2$-$C_4$ alkyl (meth)acrylate, amino-$C_2$-$C_4$ alkyl (meth)acrylamide, $C_1$-$C_3$ alkylamino-$C_2$-$C_4$ alkyl (meth)acrylamide, vinylamine, allylamine, and combinations thereof.

Any suitable hydrophilic vinylic monomers can be used in the preparation of the hydrophilic copolymer. Examples of suitable hydrophilic vinylic monomers include without limitation carboxyl-containing vinylic monomers, primary amine-containing vinylic monomers, secondary amine-containing vinylic monomers, non-reactive hydrophilic vinylic monomers, phosphorylcholine-containing vinylic monomers, and combinations thereof.

Examples of preferred hydrophilic vinylic monomers are alkyl (meth)acrylamides (as described below), hydroxyl-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers (as described below), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryoyloxy)propyl-2'-(trimethylammonio)ethylphosphate), 4-((meth)acryoyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tributylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyoxy) pentyl-2'-(trimethylammonio)ethylphosphate, 2-((meth)acryloyloxy)hexyl-2'-(trimethylammonio)ethyl phosphate, 2-(vinyloxy)ethyl-2'-(trimethyamonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

Examples of preferred acrylic monomers having 3 to 16 carbon atoms include without limitation $C_1$-$C_{12}$ alkyl (meth)acrylates, hydroxy-substituted $C_2$-$C_{12}$ alkyl (meth)acrylates, carboxy-substituted $C_2$-$C_{12}$ alkyl (meth)acrylates, $NH_2$-substituted $C_2$-$C_{12}$ alkyl (meth)acrylates, methylamino-substituted $C_2$-$C_{12}$ alkyl (meth)acrylates, dimethylamino-substituted $C_2$-$C_{12}$ alkyl (meth)acrylates, ethylamino-substituted $C_2$-$C_{10}$ alkyl (meth)acrylates, diethylamino-substituted $C_2$-$C_8$ alkyl (meth)acrylates, $C_2$-$C_{12}$ alkyl (meth)acrylamides, hydroxy-substituted $C_2$-$C_{12}$ alkyl (meth)acrylamides, carboxy-substituted $C_2$-$C_{12}$ alkyl (meth)acrylaides, $NH_2$-substituted $C_2$-$C_{12}$ alkyl (meth)acrylamides, methylamino-substituted $C_2$-$C_{12}$ alkyl (meth)acrylamides, dimethylamino-substituted $C_2$-$C_{12}$ alkyl (meth)acrylamides, ethylamino-substituted $C_2$-$C_{10}$ alkyl (meth)acrylamides, diethylamino-substituted $C_2$-$C_8$ alkyl (meth)acrylamides, ethylene glycol (meth)acrylate, di(ethylene glycol) (meth)acrylate, tri(ethylene glycol) (meth)acrylate, tetra(ethylene glycol) (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, and combinations thereof.

In accordance with the invention, a hydrophilic copolymer for coating a hydrogel contact lens of the invention has a weight average molecular weight of at least about 100,000 Daltons, preferably at least about 125,000 Daltons, more preferably at least about 250,000 Daltons, even more preferably at least about 400,000 Daltons. It is believed that a high molecular weight hydrophilic copolymer would be more suitable for forming a relative-stable and thicker coating and thereby would provide a higher lubricity to coated contact lenses.

In accordance with the invention, contacting of a preformed hydrogel contact lens with an aqueous solution of a hydrophilic copolymer can occur by dipping it into the aqueous solution or by spraying it with the aqueous solution. One contacting process involves solely dipping the preformed hydrogel contact lens in a bath of an aqueous solution for a time period or alternatively dipping the preformed hydrogel contact lens sequentially in a series of bath of aqueous solutions for a fixed shorter time period for each bath. Another contacting process involves solely spray an aqueous solution. However, a number of alternatives involve various combinations of spraying- and dipping-steps may be designed by a person having ordinary skill in the art. Preferably, the step of contacting is performed by immersing the preformed hydrogel contact lens in the aqueous solution in a lens package, and the aqueous solution is a packaging solution.

The aqueous solution has a pH of from about 6.5 to about 9.0.

In any one of the above preferred embodiments, the aqueous solution comprises from about 0.01% to about 2.5% by weight (preferably from about 0.02% to about 2.0% by weight, more preferably from about 0.05% to about 1.5% by weight, even more preferably from about 0.1% to about 1% by weight) of at least one hydrophilic copolymer (any of those described above).

The contacting time period is preferably at least 1 minute, preferably at least 5 minutes, more preferably at least 10 minutes, even more preferably from about 20 minutes to 5 hours.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for 30 to 90 minutes under pressure) prior to dispensing to users. A person skilled in the art will understand well how to seal and sterilize lens packages.

In a preferred embodiment, the aqueous solution is a packaging solution which contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinylpyrrolidone).

The packaging solution contains a buffering agent in an amount sufficient to maintain a pH of the packaging solution in the desired range. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. Preferably, the buffering agents are phosphate buffers, borate buffers, or combinations thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly-acceptable tonicity agents include, but are not limited to sodium chloride, potassium chloride, and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of the hydrophilic copolymer.

In a further embodiment, a method of the invention further comprises step of sealing the preformed hydrogel contact lens immersed in the aqueous solution in a lens package and autoclave the sealed lens package at a temperature of from about 115° C. to about 125° C. for approximately 20-90 minutes.

In another aspect, the invention provides a soft contact lens which comprises a hydrogel lens body and a coating thereon, wherein the hydrogel lens body comprises or is made of a polymeric material having 1,2- and/or 1,3-diol moieties, wherein the coating comprises a layer of a hydrophilic copolymer comprising (a) arylborono-containing repeating units each having a boronic acid group and (b) repeating units of at least one hydrophilic vinylic monomer, wherein the coating is covalent attached onto the hydrogel lens body through linkages each formed between one of the boronic acid groups of the hydrophilic copolymer and one of the 1,2-diol and 1,3-diol moieties of the hydrogel lens body, wherein the soft contact lens has a surface lubricity better than the lubricity of the hydrogel lens body.

A hydrogel lens body has a 3-dimensional shape of a hydrogel contact lens. In accordance with the invention, a preformed hydrogel contact lens (any one of those described above) becomes a hydrogel lens body after being subjected to a surface treatment (as described above) for forming a coating (or layer) of a hydrophilic copolymer (any one of those described above) on the preformed hydrogel contact lens (i.e., the hydrogel lens body).

In accordance with the invention, the soft contact lens has a water content of preferably from about 15% to about 80%, more preferably from about 30% to about 70% by weight (at room temperature, about 22° C. to 28° C.), an elastic modulus of from about 0.2 MPa to about 1.5 MPa (preferably from about 0.3 MPa to about 1.3 MPa, more preferably from about 0.4 MPa to about 1.1 MPa, even more preferably from about 0.5 MPa to about 1.0 MPa, when fully hydrated. Furthermore, the soft contact lens has a friction rating of about 2.5 or lower (preferably about 2.0 or lower, more preferably about 1.5 or lower, even more preferably about 1.0 or lower).

A soft contact lens of the invention can find particular uses as daily disposable hydrogel contact lens having an improved surface lubricity for providing improved wearing comfort. It is believed that such a soft contact lens has a build-in wearing compliance due to the reversibility nature of cyclic boronic ester linkages which are responsible for anchoring the lubricious coating on the surface of the soft contact lens of the invention. It is believed that when such a lens is worn by a patient, cyclic boronic ester linkages can be broken gradually over a long time period (e.g., over 10 to 16 hours) by the pH change and the presence of saccharides in the tear fluid and the hydrophilic copolymer can be gradually released into the eye of the patient as a lubricant. The deterioration in surface lubricity of the soft contact lens after being worn for one day could be served as a build-in daily-wearing compliance.

In also another aspect, the invention provides an aqueous solution for treating, storing or packaging a hydrogel lens contact lens made of a polymeric material comprising 1,2-diol and 1,3-diol moieties, the aqueous solution comprising one or more buffering agents in an amount sufficient to maintain a pH of from about 6 to about 8 and a hydrophilic copolymer which comprises (a) arylborono-containing repeating units each having a boronic acid and (b) repeating units of at least one hydrophilic vinylic monomer, wherein the hydrophilic copolymer is capable of being covalently attached onto the hydrogel contact lens through linkages each formed between one of the boronic acid groups of the hydrophilic copolymer and one of the 1,2-diol and 1,3-diol moieties of the polymeric material, thereby forming a layer or coating of the hydrophilic copolymer on the hydrogel contact lens.

All the various embodiments of hydrophilic copolymers, buffering agents, tonicity agents, tonicity, and viscosity described above are incorporated in this aspect of the invention.

An aqueous solution of the invention can find particular uses for treating, in particular, storing or packaging a hydrogel contact lens made of a polymeric material having 1,2- and/or 1,3-diol moieties, so as to improve the surface lubricity of the hydrogel contact lens.

In a further aspect, the invention provides an ophthalmic product, comprising a sealed and sterilized package which includes a packaging solution and a soft hydrogel contact lens which has been immersed and autoclaved in the packaging solution in the sealed package, wherein the packaging solution has a pH of from about 6.0 to about 8.0, a tonicity of from about 200 to about 450 mOsm/kg, and a viscosity of up to about 5.0 centipoises at 25° C., wherein the soft contact lens comprises a hydrogel lens body and a coating thereon, wherein the hydrogel lens body comprises or is made of a polymeric material having 1,2-diol and 1,3-diol moieties, wherein the coating comprises a layer of a hydrophilic copolymer comprising (a) arylborono-containing repeating units each having a boronic acid group and (b) repeating units of at least one hydrophilic vinylic monomer, wherein the coating is covalent attached onto the hydrogel lens body through linkages each formed between one of the boronic acid groups of the hydrophilic copolymer and one of the 1,2-diol and 1,3-diol moieties of the polymeric material.

All the various embodiments of soft contact lenses, hydrophilic copolymers, packaging solutions, buffering agents, tonicity agents, tonicity, and viscosity described above are incorporated in this aspect of the invention.

An ophthalmic product of the invention can find particular uses as daily disposable hydrogel contact lens having an improved surface lubricity for providing improved wearing comfort.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing soft contact lenses, comprising the steps of:
    (1) obtaining a preformed hydrogel contact lens, wherein the preformed hydrogel contact lens comprises or is made a polymeric material having 1,2- and/or 1,3-diol moieties; and
    (2) contacting the preformed hydrogel contact lens with an aqueous solution of a hydrophilic copolymer which comprises (a) arylborono-containing repeating units each having a boronic acid and (b) repeating units of at least one hydrophilic vinylic monomer, for a time period to covalently attach a layer or coating of the hydrophilic copolymer onto the preformed hydrogel contact lens through linkages each formed between one of the boronic acid groups of the hydrophilic copolymer and one of the 1,2-diol and 1,3-diol moieties of the polymeric material.
2. The method of embodiment 1, wherein the preformed hydrogel contact lens has a first surface lubricity, wherein the soft contact lens has a second surface lubricity which is better than the first surface lubricity of the preformed hydrogel contact lens.
3. The method of embodiment 1 or 2, wherein the aqueous solution has a pH of from about 6.5 to about 9.0.
4. The method of embodiment 1 or 2, wherein the aqueous solution has a pH of from about 6.5 to about 8.5.
5. The method of embodiment 1 or 2, wherein the aqueous solution has a pH of from about 6.8 to about 8.0.
6. The method of any one of embodiments 1 to 5, wherein the aqueous solution comprises from about 0.01% to about 2.5% by weight of the hydrophilic copolymer.
7. The method of any one of embodiments 1 to 5, wherein the aqueous solution comprises from about 0.02% to about 2.0% by weight of the hydrophilic copolymer.
8. The method of any one of embodiments 1 to 5, wherein the aqueous solution comprises from about 0.05% to about 1.5% by weight of the hydrophilic copolymer.
9. The method of any one of embodiments 1 to 5, wherein the aqueous solution comprises from about 0.05% to about 1% by weight of the hydrophilic copolymer.
10. The method of any one of embodiments 1 to 9, wherein the contacting time period is at least 1 minute.
11 The method of any one of embodiments 1 to 9, wherein the contacting time period is at least 5 minutes.
12. The method of any one of embodiments 1 to 9, wherein the contacting time period is at least 10 minutes.
13. The method of any one of embodiments 1 to 9, wherein the contacting time period is from about 20 minutes to about 5 hours.
14. The method of any one of embodiments 1 to 13, wherein the step of contacting is performed by immersing the preformed hydrogel contact lens in the aqueous solution directly in a lens package, wherein the aqueous solution is a packaging solution.
15. The method of embodiment 14, wherein the packaging solution contains a buffering agent for maintaining pH of the packaging solution.
16. The method of embodiment 14 or 15, wherein packaging solution has a tonicity of from about 200 to about 450 milliosmol (mOsm).
17. The method of embodiment 14 or 15, wherein packaging solution has a tonicity of from about 250 to about 350 mOsm.
18. The method of any one of embodiments 14 to 17, further comprising the steps of sealing the lens package and autoclaving the sealed lens package at a temperature of from about 115° C. to about 125° C. for approximately 20-90 minutes.
19. The method of any one of embodiments 1 to 18, wherein the preformed hydrogel contact lens is obtained by: introducing a lens-forming composition (or formulation) into a reusable mold and curing under a spatial limitation of actinic radiation the lens-forming composition (or formulation) within the reusable mold.
20. The method of any one of embodiments 1 to 18, wherein the preformed hydrogel contact lens is obtained by: introducing a lens-forming composition (or formulation) into a disposable mold and curing the lens-forming composition (or formulation) within the disposable mold.
21. A soft contact lens, comprising: a hydrogel lens body and a coating thereon, wherein the hydrogel lens body comprises or is made of a polymeric material having 1,2- and/or 1,3-diol moieties,
    wherein the coating comprises a layer of a hydrophilic copolymer comprising (a) arylborono-containing repeating units each having a boronic acid group and (b) repeating units of at least one hydrophilic vinylic monomer, wherein the coating is covalent attached onto the hydrogel lens body through linkages each formed between one of the boronic acid groups of the hydrophilic copolymer and one of the 1,2-diol and 1,3-diol moieties of the polymeric material.
22. The method of any one of embodiments 1 to 20 or the soft contact lens of embodiment 21, wherein the preformed hydrogel contact lens or the hydrogel lens body comprises or is made of a polymeric material comprising at least 50% by mole of repeating units of vinyl alcohol.

23. The method of any one of embodiments 1 to 20 or the soft contact lens of embodiment 21, wherein the preformed hydrogel contact lens or the hydrogel lens body comprises or is made of a polymeric material comprising at least 60% by mole of repeating units of vinyl alcohol.

24. The method of any one of embodiments 1 to 20 or the soft contact lens of embodiment 21, wherein the preformed hydrogel contact lens or the hydrogel lens body comprises or is made of a polymeric material comprising at least 70% by mole of repeating units of vinyl alcohol.

25. The method of any one of embodiments 1 to 20 or the soft contact lens of embodiment 21, wherein the preformed hydrogel contact lens or the hydrogel lens body comprises or is made of a polymeric material comprising at least 75% by mole of repeating units of vinyl alcohol.

26. The method of any one of embodiments 1 to 20 and 22 to 25 or the soft contact lens of any one of embodiments 21 to 25, wherein the preformed hydrogel contact lens or the hydrogel lens body comprises or is made of a polymeric material which is a polymerization product of a water-soluble, actinically-crosslinkable polyvinylalcohol prepolymer which comprises: repeating units of vinyl alcohol and repeating units of formula (I)

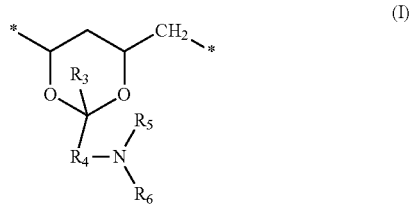

in which:
- $R_3$ can be hydrogen or a $C_1$-$C_6$ alkyl group (preferably hydrogen);
- $R_4$ is a $C_1$-$C_6$ alkylene divalent radical (preferably a $C_1$-$C_4$ alkylene divalent radical, more preferably methylene or butylene divalent radical, even more preferably methylene divalent radical);
- $R_5$ is hydrogen or $C_1$-$C_6$ alkyl (preferably hydrogen or $C_1$-$C_4$ alkyl, more preferably hydrogen or methyl or ethyl, even more preferably hydrogen or methyl);
- $R_6$ is an ethylenically unsaturated group of

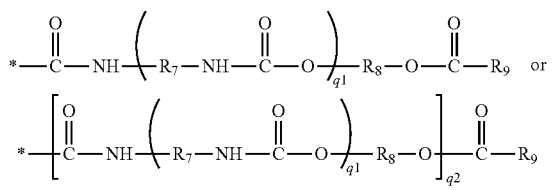

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

27. The method or soft contact lens of embodiment 26, wherein in formula (I) $R_4$ is methylene divalent radical, $R_5$ is hydrogen or $C_1$-$C_4$ alkyl, $R_3$ is hydrogen, and $R_6$ is a radical of

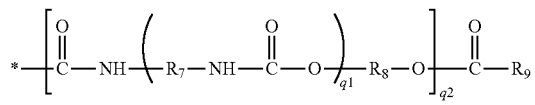

in which q2 is zero, $R_9$ is vinyl (*—CH═CH$_2$) or 1-methylethenyl (*—C(CH$_3$)═CH$_2$).

28. The method or soft contact lens of embodiment 26 or 27, wherein the polyvinylalcohol prepolymer has a weight average molecular weight of at least about 2,000 Daltons, and comprises from about 1% to about 25% by mole (preferably from about 2% to about 15% by mole) of the repeating units of formula (I).

29. The method of any one of embodiments 1 to 20 and 22 to 25 or the soft contact lens of any one of embodiments 21 to 25, wherein the preformed hydrogel contact lens or the hydrogel lens body comprises or is made of a polymeric material that comprises at least one type of diol-containing repeating units each having one or more 1,2- and/or 1,3-diol moieties and has at least 5% by repeating-unit-equivalent of 1,2- and 1,3-diol moieties.

30. The method of any one of embodiments 1 to 20 and 22 to 25 or the soft contact lens of any one of embodiments 21 to 25, wherein the preformed hydrogel contact lens or the hydrogel lens body comprises or is made of a polymeric material that comprises at least one type of diol-containing repeating units each having one or more 1,2- and/or 1,3-diol moieties and has at least 10% by repeating-unit-equivalent of 1,2- and 1,3-diol moieties.

31. The method of any one of embodiments 1 to 20 and 22 to 25 or the soft contact lens of any one of embodiments 21 to 25, wherein the preformed hydrogel contact lens or the hydrogel lens body comprises or is made of a polymeric material that comprises at least one type of diol-containing repeating units each having one or more 1,2- and/or 1,3-diol moieties and has at least 15% by repeating-unit-equivalent of 1,2- and 1,3-diol moieties.

32. The method of any one of embodiments 1 to 20 and 22 to 25 or the soft contact lens of any one of embodiments 21 to 25, wherein the preformed hydrogel contact lens or the hydrogel lens body comprises or is made of a polymeric material that comprises at least one type of diol-containing repeating units each having one or more 1,2- and/or 1,3-diol moieties and has at least 20% by repeating-unit-equivalent of 1,2- and 1,3-diol moieties.

33. The method of any one of embodiments 1 to 20 and 22 to 25 or the soft contact lens of any one of embodiments 21 to 25, wherein the polymeric material comprises repeating units of at least one diol-containing vinylic monomer.

34. The method or soft contact lens of embodiment 33, wherein said at least one diol-containing vinylic monomer is selected from the group consisting of N-2,3-dihydroxypropyl (meth)acrylamide, N-tris(hydroxymethyl)methyl (meth)acrylamide, 2-gluconamidoethyl (meth)acrylamide, 3-gluconamidopropyl (meth)acrylamide, glycerol (meth)acrylate, glucosyl (meth)acrylate, glucosyloxyethyl (meth)acrylate, 3-allyoxy-1,2-propanediol, 2-allyloxymethyl-2-(hydroxymethyl)-1,3-propanediol, 2-allyloxymethyl-2-ethyl-1,3-propanediol (i.e., trimethylolpropaneallylether), allyl α-D-mannopyranoside, allyl α-D-galactopyranoside, allyl 6-deoxyhexopyranoside, allyl 6-deoxy-2-O-methylhexopyranoside, and combinations thereof.

35. The method of any one of embodiments 1 to 20, 22 to 25, 33 and 34 or the soft contact lens of any one of embodiments 21 to 25, 33 and 34, wherein the polymeric material comprises repeating units of at least one diol-containing vinylic crosslinker.

36. The method or soft contact lens of embodiment 35, wherein said at least one diol-containing vinylic crosslinker is selected from the group consisting of N,N'-(1,2-dihydroxyethylene)bis-(meth)acrylamide, N,N'-(2,3-dihydroxybutylene)bis-(meth)acrylamide, a polydimethylsiloxane vinylic crosslinkers comprising siloxane units each having methyl substituent and one diol-containing substituent, and combinations thereof.

37. The method of any one of embodiments 1 to 20 and 22 to 36 or the soft contact lens of any one of embodiments 21 to 36, wherein the hydrophilic copolymer comprises (a) from about 0.5% by mole to about 25% by mole of the arylborono-containing repeating units and (b) from about 75% by mole to about 99.5% by mole of the repeating units of said at least one hydrophilic vinylic monomer, provided that the sum of the mole percentages of components (a) and (b) and other components not listed above is 100%.

38. The method of any one of embodiments 1 to 20 and 22 to 36 or the soft contact lens of any one of embodiments 21 to 36, wherein the hydrophilic copolymer comprises (a) from about 1% to about 20% by mole of the arylborono-containing repeating units and (b) from about 80% to about 99% by mole of the repeating units of said at least one hydrophilic vinylic monomer, provided that the sum of the mole percentages of components (a) and (b) and other components not listed above is 100%.

39. The method of any one of embodiments 1 to 20 and 22 to 36 or the soft contact lens of any one of embodiments 21 to 36, wherein the hydrophilic copolymer comprises (a) from about 2% to about 18% by mole of the arylborono-containing repeating units and (b) from about 82% to about 98% by mole of the repeating units of said at least one hydrophilic vinylic monomer, provided that the sum of the mole percentages of components (a) and (b) and other components not listed above is 100%.

40. The method of any one of embodiments 1 to 20 and 22 to 36 or the soft contact lens of any one of embodiments 21 to 36, wherein the hydrophilic copolymer comprises (a) from about 3% to about 15% by mole of the arylborono-containing repeating units and (b) from about 85% to about 97% by mole of the repeating units of said at least one hydrophilic vinylic monomer, provided that the sum of the mole percentages of components (a) and (b) and other components not listed above is 100%.

41. The method of any one of embodiments 1 to 20 and 22 to 40 or the soft contact lens of any one of embodiments 21 to 40, wherein said at least one arylborono-containing vinylic monomer is a vinylic monomer of formula (II)

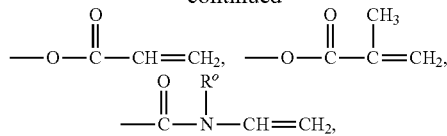

in which:
$R_1$ is H, $NO_2$, F, Cl, or $CF_3$; Q is a monovalent radical of

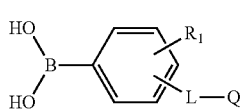

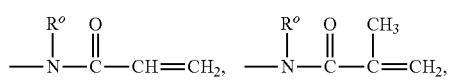

—$CH_2$—CH=$OH_2$, or —CH=$CH_2$; L is a direct bond, a $C_1$-$C_4$ alkylene divalent radical, a divalent radical of

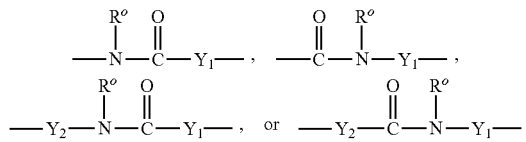

in which $Y_1$ is CH(OH) or a $C_1$-$C_4$ alkylene divalent radical, $Y_2$ is a $C_1$-$C_4$ alkylene divalent radical, and $R^o$ is H or a $C_1$-$C_4$ alkyl.

42. The method of any one of embodiments 1 to 20 and 22 to 40 or the soft contact lens of any one of embodiments 21 to 40, wherein said at least one arylborono-containing vinylic monomer is selected from the group consisting of 3-vinylphenylboronic acid, 4-vinylboronic acid, 3-(meth)acrylamidophenylboronic acid, 4-(meth)acrylamidophenylboronic acid, and combinations thereof.

43. The method of any one of embodiments 1 to 20 and 22 to 40 or the soft contact lens of any one of embodiments 21 to 40, wherein said at least one arylborono-containing vinylic monomer is selected from the group consisting of a reaction production of an amino-containing phenylboronic acid derivative with (meth)acrylic acid halide, a reaction product of an amino-containing phenylboronic acid derivative with a carboxy-containing vinylic monomer in the presence of a carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide, a reaction production of a carboxy-containing phenylboronic acid derivative with an amino-containing vinylic monomer in the presence of a carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide, and combinations thereof.

44. The method or the soft contact lens of embodiment 43, wherein the carboxy-containing phenylboronic acid derivative is selected from the group consisting of 3-carboxyphenylboronic acid, 4-carboxyphenylboronic acid, 3-boronophenylacetic acid, 4-boronophenylacetic acid, 2-(4-boronophenyl)-2-methylpropanoic acid, 3-(4-boronophenyl)propanoic acid, 3-(3-boronophenyl)propanoic acid, 5-(3-boronophenyl)pentanoic acid, 5-(4-boronophenyl)pentanoic acid, 4-(2-carboxyethyl)-3-nitrophenylboronic acid, 3-(3-carboxypropyonylamino) phenylboronic acid, 3-amino-3-(4-boronophenyl) propanoic acid, and combinations thereof, wherein the amino-containing phenylboronic acid derivative is selected from the group consisting of 3-aminophenylboronic acid, 4-aminophenylboronic acid, 4-amino-3-nitrophenylboronic acid, 4-amino-4-fluorophenylboronic acid, 2-(aminomethyl)-5-nitrophenylboronic acid, 3-(aminomethyl)-phenylboronic acid, 3-amino-5-nitrophenylboronic acid, 3-amino-3-(4-boronophenyl)propanoic acid, and combinations thereof,
wherein the carboxy-containing vinylic monomer is selected from the group consisting of 2-acrylamidoglycolic acid, 3-acrylamidopropionic acid, 4-acrylamidobutanoic acid, 5-acrylamidopentanoic acid, 3-acryloyloxypropanoic acid, 4-acryloyloxybutanoic acid, 5-acryloyloxypentanoic acid, and combinations thereof,
wherein the amino-containing vinylic monomers is selected from the group consisting of amino-$C_2$-$C_4$ alkyl (meth)acrylate, $C_1$-$C_3$ alkylamino-$C_2$-$C_4$ alkyl (meth)acrylate, amino-$C_2$-$C_4$ alkyl (meth)acrylamide, $C_1$-$C_3$ alkylamino-$C_2$-$C_4$ alkyl (meth)acrylamide, vinylamine, allylamine, and combinations thereof.

45. The method of any one of embodiments 1 to 20 and 22 to 44 or the soft contact lens of any one of embodiments 21 to 44, wherein said at least one hydrophilic vinylic monomer comprises a phosphorylcholine-containing vinylic monomer.

46. The method or the soft contact lens of embodiment 45, wherein said at least one hydrophilic vinylic monomer further comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

47. The method or the soft contact lens of embodiment 45, wherein said at least one hydrophilic vinylic monomer further comprises at least one vinylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

48. The method or the soft contact lens of embodiment 45, wherein said at least one hydrophilic vinylic monomer further comprises at least one vinylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

49. The method or the soft contact lens of embodiment 45, wherein said at least one hydrophilic vinylic monomer further comprises at least one vinylic monomer selected from the group consisting of 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, and combinations thereof.

50. The method or the soft contact lens of embodiment 45, wherein said at least one hydrophilic vinylic monomer further comprises at least one vinylic monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

51. The method or the soft contact lens of embodiment 45, wherein said at least one hydrophilic vinylic monomer further comprises at least one vinylic monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

52. The method or the soft contact lens of embodiment 45, wherein said at least one hydrophilic vinylic monomer further comprises at least one vinylic monomer selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxypoly(ethylene glycol)ethyl (meth)acrylamide having a number average molecular weight of up to 1500, and combinations thereof.

53. The method or the soft contact lens of embodiment 45, wherein said at least one hydrophilic vinylic monomer further comprises at least one vinylic monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

54. The method or the soft contact lens of embodiment 45, wherein said at least one hydrophilic vinylic monomer further comprises at least one vinylic monomer selected from the group consisting of allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

55. The method of any one of embodiments 1 to 20 and 22 to 44 or the soft contact lens of any one of embodiments 21 to 44, wherein the hydrophilic copolymer comprises (a) from about 1% to about 20% by mole of the arylborono-containing repeating units, (b) from about 60% to about 98% by mole of repeating units of at least one phosphorylcholine-containing vinylic monomer, and (c) from about 1% by mole to about 20% by mole of acrylic monomeric units of at least one acrylic monomer having 3 to 16 carbon atoms, provided that the sum of the mole percentages of components (a), (b) and (c) and other components not listed above is 100%.

56. The method of any one of embodiments 1 to 20 and 22 to 44 or the soft contact lens of any one of embodiments 21 to 44, wherein the hydrophilic copolymer comprises (a) from about 1% to about 20% by mole of the arylborono-containing repeating units, (b) from about 60% to about 97% by mole of repeating units of at least one phosphorylcholine-containing vinylic monomer, and (c) from about 2% to about 20% by mole of acrylic monomeric units of at least one acrylic monomer having 3 to 16 carbon atoms, provided that the sum of the mole percentages of components (a), (b) and (c) and other components not listed above is 100%.

57. The method of any one of embodiments 1 to 20 and 22 to 44 or the soft contact lens of any one of embodiments 21 to 44, wherein the hydrophilic copolymer comprises (a) from about 2% to about 15% by mole of the arylborono-containing repeating units, (b) from about 70% to about 95% by mole of repeating units of at least one phosphorylcholine-containing vinylic monomer, and (c) from about 3% to about 15% by mole of acrylic monomeric units of at least one acrylic monomer having 3 to 16 carbon atoms, provided that the sum of the mole percentages of components (a), (b) and (c) and other components not listed above is 100%.

58. The method or soft contact lens of any one of embodiments 55 to 57, wherein said at least one acrylic monomer has 3 to 14 carbon atoms.

59. The method or soft contact lens of any one of embodiments 55 to 57, wherein said at least one acrylic monomer has 3 to 12 carbon atoms.

60. The method or soft contact lens of any one of embodiments 55 to 57, wherein said at least one acrylic monomer has 3 to 10 carbon atoms.

61. The method or the soft contact lens of any one of embodiments 55 to 57, wherein said at least one acrylic monomer is selected from the group consisting of a $C_1$-$C_{12}$ alkyl (meth)acrylate, a hydroxy-substituted $C_2$-$C_{12}$ alkyl (meth)acrylate, a carboxy-substituted $C_2$-$C_{12}$ alkyl (meth)acrylate, an $NH_2$-substituted $C_2$-$C_{12}$ alkyl (meth)acrylate, a methylamino-substituted $C_2$-$C_{12}$ alkyl (meth)acrylate, a dimethylamino-substituted $C_2$-$C_{12}$ alkyl (meth)acrylate, an ethylamino-substituted $C_2$-$C_{10}$ alkyl (meth)acrylate, a diethylamino-substituted $C_2$-$C_8$ alkyl (meth)acrylate, a $C_2$-$C_{12}$ alkyl (meth)acrylamide, a hydroxy-substituted $C_2$-$C_{12}$ alkyl (meth)acrylamide, a carboxy-substituted $C_2$-$C_{12}$ alkyl (meth)acrylaide, an $NH_2$-substituted $C_2$-$C_{12}$ alkyl (meth)acrylamide, a methylamino-substituted $C_2$-$C_{12}$ alkyl (meth)acrylamide, a dimethylamino-substituted $C_2$-$C_{12}$ alkyl (meth)acrylamide, an ethylamino-substituted $C_2$-$C_{10}$ alkyl (meth)acrylamide, a diethylamino-substituted $C_2$-$C_8$ alkyl (meth)acrylamide, ethylene glycol (meth)acrylate, di(ethylene glycol) (meth)acrylate, tri(ethylene glycol) (meth)acrylate, tetra(ethylene glycol) (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, and combinations thereof.

62. The method or soft contact lens of any one of embodiments 55 to 57, wherein said at least one acrylic monomer is n-butyl (meth)acrylate and/or di(ethylene glycol) methyl ether (meth)acrylate.

63. The method or the soft contact lens of any one of embodiments 45 to 62, wherein the phosphorylcholine-containing vinylic monomer is selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino] butyl-2'-(trimethylammonio)ethylphosphate, 5-(meth)acryloyloxy)pentyl-2'-(trimethylammonio)ethyl phosphate, 6-((meth)acryloyloxy) hexy-2'-(trimethylammonio)-ethylphosphate, 2-((meth)acryloyloxy)ethyl-2'-(triethylammonio)ethylphosphate, 2-((meth)acryoyloxy)ethyl-2'-(tripropylammonio)ethylphosphate, 2-((meth)acryloyloxy)ethyl-2'-(tributylammonio)ethyl phosphate, 2-((meth)acryloyloxy) propyl-2'-(trimethylammonio)-ethylphosphate, 2-((meth)acryloyloxy)butyl-2'-(trimethylammonio)ethylphosphate 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosposphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

64. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, N-2-hydroxyethyl vinyl carbamate, N-carboxyvinyl-β-alanine (VINAL), N-carboxyvinyl-α-alanine, and combinations thereof.

65. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof 66. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

67. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, vinylamine, allylamine, and combinations thereof.

68. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of acrylic acid, methacrylic acid, ethylacrylic acid, propylacrylic acid, 2-acrylamidoglycolic acid, 3-acrylamidopropionic acid, 4-acrylamidobutanoic acid, 5-acrylamidopentanoic acid, 3-acryloyloxypropanoic acid, 4-acryloyloxybutanoic acid, 5-acryloyloxypentanoic acid, and combinations thereof.

69. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

70. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

71. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

72. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

73. The method of any one of embodiments 1 to 20 and 22 to 44 or the soft contact lens of any one of embodiments 21 to 44, wherein said at least one hydrophilic vinylic monomer comprises at least one vinylic monomer selected from the group consisting of allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

74. The method of any one of embodiments 1 to 20 and 22 to 73 or the soft contact lens of any one of embodiments 21 to 73, wherein the soft contact lens has an equilibrium water content of from about 15% to about 80% by weight (at room temperature, about 22° C. to 28° C.), when being fully hydrated.

75. The method of any one of embodiments 1 to 20 and 22 to 74 or the soft contact lens of any one of embodiments 21 to 74, wherein the soft contact lens has an elastic modulus of from about 0.2 MPa to about 1.5 MPa, when being fully hydrated.

76. The method of any one of embodiments 1 to 20 and 22 to 74 or the soft contact lens of any one of embodiments 21 to 74, wherein the soft contact lens has an elastic modulus of from about 0.3 MPa to about 1.3 MPa, when being fully hydrated.

77. The method of any one of embodiments 1 to 20 and 22 to 74 or the soft contact lens of any one of embodiments 21 to 74, wherein the soft contact lens has an elastic modulus of from about 0.4 MPa to about 1.1 MPa, when being fully hydrated.

78. The method of any one of embodiments 1 to 20 and 22 to 74 or the soft contact lens of any one of embodiments 21 to 74, wherein the soft contact lens has an elastic modulus of from about 0.5 MPa to about 1.0 MPa, when being fully hydrated.

79. The method of any one of embodiments 1 to 20 and 22 to 78 or the soft contact lens of any one of embodiments 21 to 78, wherein the hydrophilic copolymer has a weight average molecular weight of at least about 100,000 Daltons.

80. The method of any one of embodiments 1 to 20 and 22 to 78 or the soft contact lens of any one of embodiments 21 to 78, wherein the hydrophilic copolymer has a weight average molecular weight of at least about 125,000 Daltons.

81. The method of any one of embodiments 1 to 20 and 22 to 78 or the soft contact lens of any one of embodiments 21 to 78, wherein the hydrophilic copolymer has a weight average molecular weight of at least about 250,000 Daltons.

82. The method of any one of embodiments 1 to 20 and 22 to 78 or the soft contact lens of any one of embodiments 21 to 78, wherein the hydrophilic copolymer has a weight average molecular weight of at least about 400,000 Daltons.

83. The method of any one of embodiments 1 to 20 and 22 to 82 or the soft contact lens of any one of embodiments 21 to 82, wherein the soft contact lens has a friction rating of about 2.5 or lower.

84. The method of any one of embodiments 1 to 20 and 22 to 82 or the soft contact lens of any one of embodiments 21 to 82, wherein the soft contact lens has a friction rating of about 2.0 or lower.

85. The method of any one of embodiments 1 to 20 and 22 to 82 or the soft contact lens of any one of embodiments 21 to 82, wherein the soft contact lens has a friction rating of about 1.5 or lower.

86. The method of any one of embodiments 1 to 20 and 22 to 82 or the soft contact lens of any one of embodiments 21 to 82, wherein the soft contact lens has a friction rating of about 1.0 or lower.

87. An ophthalmic product, comprising a sealed and sterilized package which includes a packaging solution and the soft contact lens of any one of embodiments 21 to 86, wherein the soft contact lens has been immersed and autoclaved in the packaging solution in the sealed package, wherein the packaging solution has a pH of from about 6.0 to about 8.0, a tonicity of from about 200 to about 450 mOsm/kg, and a viscosity of up to about 5.0 centipoises at 25° C.

88. An aqueous solution for treating, storing or packaging a hydrogel lens contact lens comprising or made of a polymeric material comprising 1,2-diol and 1,3-diol moieties, comprising:
   one or more buffering agents in an amount sufficient to maintain a pH of from about 6 to about 8; and a hydrophilic copolymer,
   wherein the hydrophilic copolymer comprises (a) arylborono-containing repeating units each having a boronic acid and (b) repeating units of at least one hydrophilic vinylic monomer,
   wherein, when in contact with the hydrogel contact lens, the hydrophilic copolymer is covalently attached onto the hydrogel contact lens through linkages each formed between one of the boronic acid groups of the hydrophilic copolymer and one of the 1,2-diol and 1,3-diol moieties of the polymeric material, thereby forming a layer or coating of the hydrophilic copolymer on the hydrogel contact lens,
   wherein the aqueous solution has a tonicity of from about 200 to about 450 milliosmol (mOsm).
89. The aqueous solution of embodiment 88, wherein the aqueous solution comprises from about 0.01% to about 2.5% by weight of the hydrophilic copolymer.
90. The aqueous solution of embodiment 88, wherein the aqueous solution comprises from about 0.02% to about 2.0% by weight of the hydrophilic copolymer.
91. The aqueous solution of embodiment 88, wherein the aqueous solution comprises from about 0.05% to about 1.5% by weight of the hydrophilic copolymer.
92. The aqueous solution of embodiment 88, wherein the aqueous solution comprises from about 0.05% to about 1% by weight of the hydrophilic copolymer.
93. The aqueous solution of any one of embodiments 88 to 92, wherein the hydrophilic copolymer comprises (a) from about 0.5% by mole to about 25% by mole of the arylborono-containing repeating units and (b) from about 75% by mole to about 99.5% by mole of the repeating units of said at least one hydrophilic vinylic monomer, provided that the sum of the mole percentages of components (a) and (b) and other components not listed above is 100%.
94. The aqueous solution of any one of embodiments 88 to 92, wherein the hydrophilic copolymer comprises (a) from about 1% to about 20% by mole of the arylborono-containing repeating units and (b) from about 80% to about 99% by mole of the repeating units of said at least one hydrophilic vinylic monomer, provided that the sum of the mole percentages of components (a) and (b) and other components not listed above is 100%.
95. The aqueous solution of any one of embodiments 88 to 92, wherein the hydrophilic copolymer comprises (a) from about 2% to about 18% by mole of the arylborono-containing repeating units and (b) from about 82% to about 98% by mole of the repeating units of said at least one hydrophilic vinylic monomer, provided that the sum of the mole percentages of components (a) and (b) and other components not listed above is 100%.
96. The aqueous solution of any one of embodiments 88 to 92, wherein the hydrophilic copolymer comprises (a) from about 3% to about 15% by mole of the arylborono-containing repeating units and (b) from about 85% to about 97% by mole of the repeating units of said at least one hydrophilic vinylic monomer, provided that the sum of the mole percentages of components (a) and (b) and other components not listed above is 100%.
97. The aqueous solution of any one of embodiments 88 to 96, wherein said at least one arylborono-containing vinylic monomer is a vinylic monomer of formula (II)

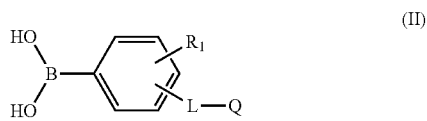

in which:
$R_1$ is H, $NO_2$, F, Cl, or $CF_3$; Q is a monovalent radical of

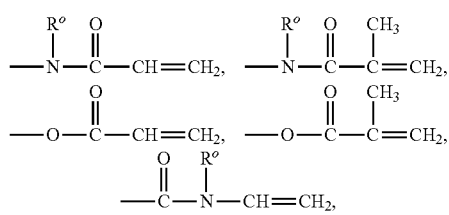

$-CH_2-CH=CH_2$, or $-CH=CH_2$; L is a direct bond, a $C_1$-$C_4$ alkylene divalent radical, a divalent radical of

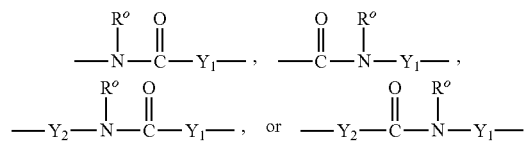

in which $Y_1$ is CH(OH) or a $C_1$-$C_4$ alkylene divalent radical, $Y_2$ is a $C_1$-$C_4$ alkylene divalent radical, and $R^o$ is H or a $C_1$-$C_4$ alkyl.
98. The aqueous solution of any one of embodiments 88 to 96, wherein said at least one arylborono-containing vinylic monomer is selected from the group consisting of 3-vinylphenylboronic acid, 4-vinylboronic acid, 3-(meth)acrylamidophenylboronic acid, 4-(meth)acrylamidophenylboronic acid, and combinations thereof.
99. The aqueous solution of any one of embodiments 88 to 96, wherein said at least one arylborono-containing vinylic monomer is selected from the group consisting of a reaction production of an amino-containing phenylboronic acid derivative with (meth)acrylic acid halide, a reaction product of an amino-containing phenylboronic acid derivative with a carboxy-containing vinylic monomer in the presence of a carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide, a reaction production of a carboxy-containing phenylboronic acid derivative with an amino-containing vinylic monomer in the presence of a carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide, and combinations thereof.
100. The aqueous solution of embodiment 99, wherein the carboxy-containing phenylboronic acid derivative is selected from the group consisting of 3-carboxyphenylboronic acid, 4-carboxyphenylboronic acid, 3-boronophenylacetic acid, 4-boronophenylacetic acid, 2-(4-boronophenyl)-2-methylpropanoic acid, 3-(4-boronophenyl) propanoic acid, 3-(3-boronophenyl)propanoic acid, 5-(3-boronophenyl)pentanoic acid, 5-(4-boronophenyl) pentanoic acid, 4-(2-carboxyethyl)-3-nitrophenylboronic acid, 3-(3-carboxypropyonylamino)phenylboronic acid, 3-amino-3-(4-boronophenyl)propanoic acid, and combinations thereof, wherein the amino-containing phenylboronic acid derivative is selected from the group consisting of 3-aminophenylboronic acid, 4-aminophenylboronic acid, 4-amino-3-nitrophenylboronic acid, 4-amino-4-fluorophenylboronic acid, 2-(aminomethyl)-5-nitrophenylboronic acid, 3-(aminomethyl)-phenylboronic acid, 3-amino-5-nitrophenylboronic acid, 3-amino-3-(4-boronophenyl)propanoic acid, and combinations thereof, wherein the carboxy-containing vinylic monomer is selected from the group consisting of 2-acrylamidoglycolic acid, 3-acrylamidopropionic acid, 4-acrylamidobutanoic acid, 5-acrylamidopentanoic acid, 3-acryloyloxypropanoic acid, 4-acryloyloxybutanoic acid, 5-acryloyloxypentanoic acid, and combinations thereof, wherein the amino-containing vinylic monomers is selected from the group consisting of amino-$C_2$-$C_4$ alkyl (meth)acrylate, $C_1$-$C_3$ alkylamino-$C_2$-$C_4$ alkyl (meth)acrylate, amino-$C_2$-$C_4$ alkyl (meth)acrylamide, $C_1$-$C_3$ alkylamino-$C_2$-$C_4$ alkyl (meth)acrylamide, vinylamine, allylamine, and combinations thereof.

101. The aqueous solution of any one of embodiments 88 to 100, wherein said at least one hydrophilic vinylic monomer comprises a phosphorylcholine-containing vinylic monomer.

102. The aqueous solution of embodiment 101, wherein said at least one hydrophilic vinylic monomer further comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

103. The aqueous solution of embodiment 101, wherein said at least one hydrophilic vinylic monomer further comprises at least one vinylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth) acrylamide, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

104. The aqueous solution of embodiment 101, wherein said at least one hydrophilic vinylic monomer further comprises at least one vinylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth) acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth) acrylate, trimethylammonium 2-hydroxy propyl (meth) acrylate hydrochloride, dimethylaminoethyl (meth) acrylate, and combinations thereof.

105. The aqueous solution of embodiment 101, wherein said at least one hydrophilic vinylic monomer further comprises at least one vinylic monomer selected from the group consisting of 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, and combinations thereof.

106. The aqueous solution of embodiment 101, wherein said at least one hydrophilic vinylic monomer further comprises at least one vinylic monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, N-2-hydroxyethyl vinyl carbamate, N-carboxyvinyl-β-alanine (VINAL), N-carboxyvinyl-α-alanine, and combinations thereof.

107. The aqueous solution of embodiment 101, wherein said at least one hydrophilic vinylic monomer further comprises at least one vinylic monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

108. The aqueous solution of embodiment 101, wherein said at least one hydrophilic vinylic monomer further comprises at least one vinylic monomer selected from the group consisting of ethylene glycol methyl ether (meth) acrylate, di(ethylene glycol) methyl ether (meth)acrylate, tri(ethylene glycol) methyl ether (meth)acrylate, tetra (ethylene glycol) methyl ether (meth)acrylate, $C_1$-$C_4$-alkoxy poly(ethylene glycol) (meth)acrylate having a weight average molecular weight of up to 1500, methoxypoly(ethylene glycol)ethyl (meth)acrylamide having a number average molecular weight of up to 1500, and combinations thereof.

109. The aqueous solution of embodiment 101, wherein said at least one hydrophilic vinylic monomer further comprises at least one vinylic monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

110. The aqueous solution of embodiment 101, wherein said at least one hydrophilic vinylic monomer further comprises at least one vinylic monomer selected from the group consisting of allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

111. The aqueous solution of embodiment 101, wherein the hydrophilic copolymer comprises (a) from about 1% to about 20% by mole of the arylborono-containing repeating units, (b) from about 60% to about 98% by mole of repeating units of at least one phosphorylcholine-containing vinylic monomer, and (c) from about 1% by mole to about 20% by mole of acrylic monomeric units of at least one acrylic monomer having 3 to 16 carbon atoms, provided that the sum of the mole percentages of components (a), (b) and (c) and other components not listed above is 100%.

112. The aqueous solution of embodiment 101, wherein the hydrophilic copolymer comprises (a) from about 1% to about 20% by mole of the arylborono-containing repeating units, (b) from about 60% to about 97% by mole of repeating units of at least one phosphorylcholine-containing vinylic monomer, and (c) from about 2% to about 20% by mole of acrylic monomeric units of at least one acrylic monomer having 3 to 16 carbon atoms, provided that the sum of the mole percentages of components (a), (b) and (c) and other components not listed above is 100%.

113. The aqueous solution of embodiment 101, wherein the hydrophilic copolymer comprises (a) from about 2% to about 15% by mole of the arylborono-containing repeating units, (b) from about 70% to about 95% by mole of repeating units of at least one phosphorylcholine-containing vinylic monomer, and (c) from about 3% to about 15% by mole of acrylic monomeric units of at least one acrylic monomer having 3 to 16 carbon atoms, provided that the sum of the mole percentages of components (a), (b) and (c) and other components not listed above is 100%.

114. The aqueous solution of any one of embodiments 111 to 113, wherein said at least one acrylic monomer has 3 to 14 carbon atoms.

115. The aqueous solution of any one of embodiments 111 to 113, wherein said at least one acrylic monomer has 3 to 12 carbon atoms.

116. The aqueous solution of any one of embodiments 111 to 113, wherein said at least one acrylic monomer has 3 to 10 carbon atoms.

117. The aqueous solution of any one of embodiments 111 to 113, wherein said at least one acrylic monomer is selected from the group consisting of a $C_1$-$C_{12}$ alkyl (meth)acrylate, a hydroxy-substituted $C_2$-$C_{12}$ alkyl (meth)acrylate, a carboxy-substituted $C_2$-$C_{12}$ alkyl (meth)acrylate, an $NH_2$-substituted $C_2$-$C_{12}$ alkyl (meth)acrylate, a methylamino-substituted $C_2$-$C_{12}$ alkyl (meth)acrylate, a dimethylamino-substituted $C_2$-$C_{12}$ alkyl (meth)acrylate, an ethylamino-substituted $C_2$-$C_{10}$ alkyl (meth)acrylate, a diethylamino-substituted $C_2$-$C_8$ alkyl (meth)acrylate, a $C_2$-$C_{12}$ alkyl (meth)acrylamide, a hydroxy-substituted $C_2$-$C_{12}$ alkyl (meth)acrylamide, a carboxy-substituted $C_2$-$C_{12}$ alkyl (meth)acrylaide, an $NH_2$-substituted $C_2$-$C_{12}$ alkyl (meth)acrylamide, a methylamino-substituted $C_2$-$C_{12}$ alkyl (meth)acrylamide, a dimethylamino-substituted $C_2$-$C_{12}$ alkyl (meth)acrylamide, an ethylamino-substituted $C_2$-$C_{10}$ alkyl (meth)acrylamide, a diethylamino-substituted $C_2$-$C_8$ alkyl (meth)acrylamide, ethylene glycol (meth)acrylate, di(ethylene glycol) (meth)acrylate, tri(ethylene glycol) (meth)acrylate, tetra(ethylene glycol) (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, and combinations thereof.

118. The aqueous solution of any one of embodiments 111 to 113, wherein said at least one acrylic monomer is n-butyl (meth)acrylate and/or di(ethylene glycol) methyl ether (meth)acrylate.

119. The aqueous solution of any one of embodiments 101 to 118, wherein the phosphorylcholine-containing vinylic monomer is selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio) ethylphosphate, 5-((meth)acryloyloxy)pentyl-2'-(trimethylammonio)ethyl phosphate, 6-((meth)acryloyloxy) hexy-2'-(trimethylammonio)-ethylphosphate, 2-((meth)acryloyloxy)ethyl-2'-(triethylammonio)ethylphosphate, 2-((meth)acryoyloxy)ethyl-2'-(tripropylammonio)ethylphosphate, 2-((meth)acryloyloxy)ethyl-2'-(tributylammonio)ethyl phosphate, 2-((meth)acryloyloxy) propyl-2'-(trimethylammonio)-ethylphosphate, 2-((meth)acryloyloxy)butyl-2'-(trimethylammonio)ethylphosphate 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosposphate, 2-(allyloxy)ethyl-2'-(trimethylammonio) ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

120. The aqueous solution of any one of embodiments 88 to 119, wherein said at least one hydrophilic vinylic monomer comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, N-2-hydroxyethyl vinyl carbamate, N-carboxyvinyl-β-alanine (VINAL), N-carboxyvinyl-α-alanine, and combinations thereof.

121. The aqueous solution of any one of embodiments 88 to 100, wherein said at least one hydrophilic vinylic monomer comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof 122. The aqueous solution of any one of embodiments 88 to 100, wherein said at least one hydrophilic vinylic monomer comprises at least one vinylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

123. The aqueous solution of any one of embodiments 88 to 100, wherein said at least one hydrophilic vinylic monomer comprises at least one vinylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, vinylamine, allylamine, and combinations thereof.

124. The aqueous solution of any one of embodiments 88 to 100, wherein said at least one hydrophilic vinylic monomer comprises at least one vinylic monomer selected from the group consisting of acrylic acid, methacrylic acid, ethylacrylic acid, propylacrylic acid, 2-acrylamidoglycolic acid, 3-acrylamidopropionic acid, 4-acrylamidobutanoic acid, 5-acrylamidopentanoic acid, 3-acryloyloxypropanoic acid, 4-acryloyloxybutanoic acid, 5-acryloyloxypentanoic acid, and combinations thereof.

125. The aqueous solution of any one of embodiments 88 to 100, wherein said at least one hydrophilic vinylic monomer comprises at least one vinylic monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

126. The aqueous solution of any one of embodiments 88 to 100, wherein said at least one hydrophilic vinylic monomer comprises at least one vinylic monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

127. The aqueous solution of any one of embodiments 88 to 100, wherein said at least one hydrophilic vinylic monomer comprises at least one vinylic monomer selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

128. The aqueous solution of any one of embodiments 88 to 100, wherein said at least one hydrophilic vinylic monomer comprises at least one vinylic monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

129. The aqueous solution of any one of embodiments 88 to 100, wherein said at least one hydrophilic vinylic monomer comprises at least one vinylic monomer selected from the group consisting of allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

130. The aqueous solution of any one of embodiments 88 to 129, wherein the hydrophilic copolymer has a weight average molecular weight of at least about 100,000 Daltons.

131. The aqueous solution of any one of embodiments 88 to 129, wherein the hydrophilic copolymer has a weight average molecular weight of at least about 125,000 Daltons.

132. The aqueous solution of any one of embodiments 88 to 129, wherein the hydrophilic copolymer has a weight average molecular weight of at least about 250,000 Daltons.

133. The aqueous solution of any one of embodiments 88 to 129, wherein the hydrophilic copolymer has a weight average molecular weight of at least about 400,000 Daltons.

134. The aqueous solution of any one of embodiments 88 to 133, wherein the aqueous solution is a packaging solution for packaging a hydrogel lens contact lens comprising or made of a polymeric material comprising 1,2-diol and 1,3-diol moieties.

135. The aqueous solution of any one of embodiments 88 to 133, wherein the aqueous solution is a storage solution for storing a hydrogel lens contact lens comprising or made of a polymeric material comprising 1,2-diol and 1,3-diol moieties.

136. The aqueous solution of any one of embodiments 88 to 133, wherein the aqueous solution is a treating solution for forming a coating on a hydrogel lens contact lens comprising or made of a polymeric material comprising 1,2-diol and 1,3-diol moieties.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Surface Wettability Tests

Water contact angle (WCA) on a contact lens is a general measure of the surface wettability of a contact lens. In particular, a low water contact angle corresponds to more wettable surface.

The dynamic captive bubble contact angles of contact lenses are measured using a FDS instrument device from FDS Future Digital Scientific Corp. The FDS equipment is capable of measuring the advancing and receding contact angles. The measurement is performed on hydrated contact lenses at room temperature. A contact lens is removed from the vial and soaked in ~40 mL fresh phosphate buffered saline (PBS) and shake for at least 30 minutes, then replace with fresh PBS, soak and shake for another 30 minutes unless otherwise specified. The contact lens is then put on a lens paper and dabbed to remove surface water prior to be placed on top of a lens holder with front curve up then screw the lens holder top on. Place the secure lens holder into the glass cell cuvette filled with filtered PBS. Place the glass cell cuvette onto the stage of the FDS instrument. Adjust the stage height and the syringe needle to dispense the air bubble to the lens surface. Repeat dispense/withdrawal 3 cycles for every lens to get the advancing and receding contact angles. The receding contact angles are reported in the examples below.

Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 μl. The tweezers and the pedestal are washed well with Isopropanol and rinsed with DI water before coming in contact with the contact lenses.

Lubricity Evaluation

The lubricity of a contact lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES@ TOTAL1®; ACUVUE® OASYS™; ACUVUE® ADVANCE PLUS™; DAILIES@ Aqua Comfort Plus@; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined directly out-of-pack (OOP), after being taken out of pack and then soaked in PBS for 230 min, or after i cycles (e.g., 7, 14, 21, or 30 cycles) of digital rubbing treatment according to the procedures described above.

Chemicals

The following abbreviations are used in the following examples: NVP represents N-vinylpyrrolidone; VPBA represents 4-vinylphenylboronic acid; PVA represents polyvinylalcohol; MPC represent 2-methacryloyloxyethyl phosphorylcholine; PBS represents a phosphate-buffered saline which has a pH of 7.2±0.2 at 25° C. and contains about 0.044 wt. % $NaH_2PO_4$—$H_2O$, about 0.388 wt. % $Na_2HPO_4.2H_2O$, and about 0.79 wt. % NaCl and; wt. % represents weight percent; TAA represents tert-amyl alcohol; PrOH represents 1-propanol; IPA represents isopropanol; $PEG_{200}MA$ represents polyethylene glycol monomethacrylate having a number average molecular weight, Mn, of 200 Daltons; $PEG_{300}MA$ represents polyethylene glycol monomethacrylate having a number average molecular weight, Mn, of 300 Daltons; $PEG_{955}MA$ represents polyethylene glycol monomethacrylate having a number average molecular weight, Mn, of 950 Daltons; DMA represents N,N-dimethylacrylamide; BMA represents n-butyl methacrylate; DGMEMA represents di(ethylene glycol) methacrylate; AAPH (Vazo-56) represent 2,2'-azobis-(2-amidinopropane dihydrochloride; DI water represents deionized water; βME represents β-mercaptoethanol; HPMC represents hydroxypropyl methylcellulose; PEG400 represents polyethylene glycol having a number average molecular weight of 400 Daltons; D9 represents monobutyl-terminated monomethacryloxypropyl-terminated polydimethylsiloxane (Mw~984 g/mol from Shin-Etsu); MMA represents methyl methacrylate; TEGDMA represent triethyleneglycol dimethacrylate; VAZO 64 represents 2,2'-dimethyl-2,2'azodipiononitrile; Nobloc is 2-[3-(2H-Benzotriazol-2-yl)-4-hydroxyphenyl]ethyl methacrylate; UV28 represents 2-{2'-Hydroxy-3'-tert-butyl-5'-[3'-methacryloyloxypropoxy]phenyl}-5-chloro-2H-benzotriazole; "G4" macromer represents a di-methacryloyloxypropyl-terminated polysiloxane (Mn 13.5K g/mol, OH content 1.8 meq/g) of formula (A).

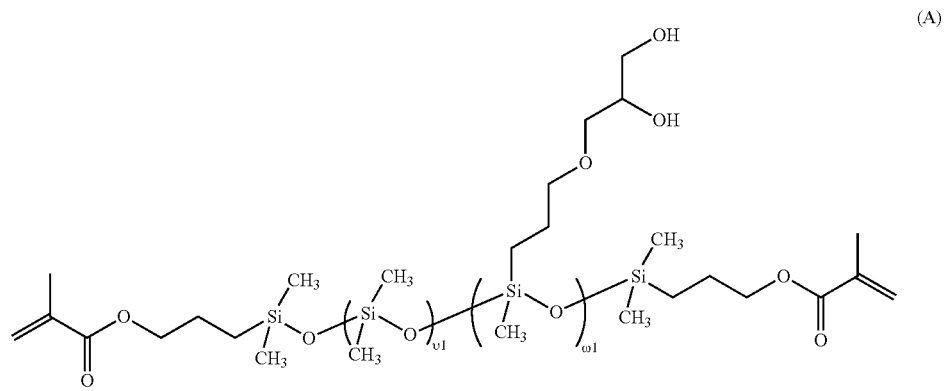

(A)

Example 2

The DAILIES® AquaComfort Plus® (DACP) contact lenses from Alcon® are polyvinylalcohol contact lenses. They are produced, according to an automated lens manufacturing process described in Example 8-8d of WO2002071106, from an aqueous lens formulation comprising a polyvinyl alcohol prepolymer having repeating units of formula (I) and prepared according to the procedures described in Example 3 of WO02/071106. The DACP contact lenses are removed from their propylene lens packages and soaked in deionized water (DI water) for overnight or longer before being used in the following examples in this application.

Example 3

Preparation of Polymerizable Compositions

Lens formulations (polymerizable compositions), III to VI, are prepared to have compositions (in unit parts) as shown in Table 1.

TABLE 1

|  | Formulation I | Formulation II | Formulation III | Formulation IV |
|---|---|---|---|---|
| D9 | 33 | 33 | 33 | 33 |
| G4 | 10 | 10 | 10 | 10 |
| NVP | 46 | 46 | 46 | 46 |
| MMA | 10 | 10 | 10 | 10 |
| TEGDMA | 0.2 | 0.2 | 0.2 | 0.65 |
| Norbloc | 1.5 | 1.5 | 1.8 | 1.5 |
| UV28 | 0.26 | 0.26 | 0 | 0.4 |
| TAA | 10 | 10 | 10 | 10 |
| Curing Profile | 55/80/100° C. 30 min/2 hr/30 min | 55/80/100° C. 40 min/40 min/40 min | 55/80/100° C. 30 min/120 min/30 min | 55/80/100° C. 30 min/120 min/30 min |

The formulations are prepared by adding listed components in their targeted amounts into a clean bottle, with a stir bar to mix at 600 rpm for 30 minutes at room temperature. After all the solid is dissolved, a filtration of the formulation is carried out by using 2.7 μm glass-microfiber-filter.

Cast-Molded Silicone Hydrogel Contact Lenses

A lens formulation is purged with nitrogen at room temperature for 30 to 35 minutes. The $N_2$-purged lens formulation is introduced into polypropylene molds and thermally cured in an oven under the following curing conditions: ramping from room temperature to a first temperature and then holding at the first temperature for a first curing time period; ramping from the first temperature to a second temperature and holding at the second temperature for a second curing time period; optionally ramping from the second temperature to a third temperature and holding at the third temperature for a third curing time period; and optionally ramping from the third temperature to a fourth temperature and holding at the fourth temperature for a fourth curing time period.

Lens molds are opened by using a demolding machine with a push pin. Lenses are pushed onto base curve molds with a push pin and then molds are separated into base curve mold halves and front curve mold halves. The base curve mold halves with a lens thereon are placed in an ultrasonic device (e.g., Dukane's single horn ultrasonic device). With a certain energy force, a dry state lens is released from mold. The dry state lens is loaded in a designed extraction tray. Alternatively, lenses can be removed from the base curve mold halves by floating off (i.e., soaking in an organic solvent, e.g., IPA, without ultrasonic).

The obtained silicone hydrogel (SiHy) contact lenses are subjected to the following post-molding processes before lens characterization. After demolding, SiHy lenses prepared above are extracted with 100% IPA for 15 minutes, immersed in 50%/50% IPA/water mixture for 30 minutes and then in DI water for 30 minutes, and finally rinsed with PBS saline for about 60 minutes at room temperature. After rinsing in PBS with 5 min, the lenses then are ready for use in the following examples of this application.

The obtained SiHy lenses are referred to glycerol-containing SiHy lenses, because they comprise repeating units of a polydimethylsiloxane vinylic crosslinker of formula (A) and each of the repeating units of polydimethylsiloxane vinylic crosslinker of formula (A) comprises a siloxane unit having one glycerol-containing organic substituent.

Example 4

Preparation of NVP-VPBA Copolymer

In a 100 ml round bottom flask, 1-Phenylvinylboronic acid 0.32 g, NVP 4.47 g and 0.047 g of Vazo 64 are added. A Nitrogen inlet is connected to the flask, as well as a water condenser. The flask is set in oil bath with magnetic stir and heated at 75° C. for 5 hours. After the reaction mixture cool down to room temperature, it is transferred to 20 ml glass vial. Nitrogen is blown into the liquid via a needle overnight and an amber color very sticky liquid is obtained. An aqueous solution of the obtained product (2% by weight) is completely clear. Aqueous phase GPC test shows number average molecular weight of 367 K Da with polydispersity of 2.6.

Preparation of Aqueous Solution of Poly(NVP-co-VPBA)

A coating solution is prepared by dissolving NVP-VPBA copolymer prepared above in DI water to have a concentration of about 2% by weight and then adjusted to pH 9.

Preparation of Poly(NVP-co-VPBA) Coated PVA Contact Lenses

PVA contact lenses prepared in Example 2 are soaked in the coating solution prepared above overnight at room temperature. The resultant PVA contact lenses are tested by XPS test. The XPS results in Table 1 show that the resultant PVA contact lenses have a relatively higher N content on lens surface compared to uncoated lens, indicating the presence of a layer (or coating) of poly(NVP-co-VPBA) on the lens surface.

TABLE 2

| Sample | Atomic % C | Atomic % N | Atomic % O |
|---|---|---|---|
| Coated PVA lenses | 65.29 | 3.62 | 31.09 |
| Uncoated lenses | 55.22 | 1.15 | 43.63 |

Example 5

Synthesis of Binary Copolymer-poly($PEG_{200}MA$-co-VPBA)

About 1.133 g of VPBA is dissolved in 25.0 g PrOH to obtain a VPBA solution which is introduced, through a syringe equipped with a 5 m nylon filter, into a 500 mL reactor equipped with $N_2$ inlet, overhead stirrer, thermocouple, condenser, and bubbler. About 18.88 g of $PEG_{200}MA$ is dissolved in 20.0 g DI water, poured into the reactor and rinsed in with an additional 2×20.0 g DI water.

About 00693 g of AAPH is dissolved in 5.0 g DI water, poured into reactor and rinsed in with an additional 2×5.0 g DI water, followed by 15.0 g DI water and 65.0 g PrOH. About 3.65 mL of mercaptoethanol (RME) solution (0.274 g βME in 100 mL of DI water) is added with a micropipette.

The reaction solution is purged with nitrogen (200 mL/minute) for 30 minutes at 20° C. while stirring at 150 rpm. Nitrogen flow is reduced to a blanket and the copolymerization solution is heated according to the following schedule: taking two hours to reach 61° C.; maintaining at 61° C. for about 8 hours; and taking 2 hours to cool down to 20° C.

Synthesis of Terpolymer—Poly(PEG$_{200}$MA-co-MPC-co-VPBA) terpolymer

About 1.011 g of VPBA is dissolved in 25.0 g PrOH to obtain a VPBA solution which is introduced, through a syringe equipped with a 5 m nylon filter, into a 500 mL reactor equipped with N$_2$ inlet, overhead stirrer, thermocouple, condenser, and bubbler. About 12.278 g of PEG$_{200}$MA is dissolved in 20.0 g DI water, poured into the reactor and rinsed in with an additional 15.0 g DI water. About 6.714 g of MPC is dissolved in 20.0 g DI water, poured into the reactor and rinsed in with an additional 15.0 g DI water. About 00693 g of AAPH is dissolved in 5.0 g deionized water, poured into reactor and rinsed in with an additional 2×5.0 g deionized water, followed by 5.0 g deionized water and 65.0 g n-propanol. About 3.65 mL of mercaptoethanol (RME) solution (0.274 g RME in 100 mL of DI water) is added with a micropipette.

The reaction solution is purged with nitrogen (200 mL/minute) for 30 minutes at 20° C. while stirring at 150 rpm. Nitrogen flow is reduced to a blanket and the copolymerization solution is heated according to the following schedule: taking two hours to reach 61° C.; maintaining at 61° C. for about 8 hours; and taking 2 hours to cool down to 20° C.

Various copolymers (binary or ternary) are prepared according to the procedures described above except different amounts and types of vinylic monomers as indicated in Table 3.

TABLE 3

| | Component (mole %) | | | | | | [BA]* | Mn | Mw | |
|---|---|---|---|---|---|---|---|---|---|---|
| | VPBA | PEG$_{300}$MA | PEG$_{950}$MA | PEG$_{200}$MA | DMA | MPG | (meq/g) | (KD) | (KD) | PDI |
| Copolymer 1 | 5.0 | 0 | 0 | 0 | 95.0 | 0 | 0.52 | | | |
| Copolymer 2 | 10.0 | 0 | 0 | 0 | 90.0 | 0 | 1.29 | | | |
| Copolymer 3 | 7.5 | 92.5 | 0 | 0 | 0 | 0 | 0.23 | 192 | 341 | 1.8 |
| Terpolymer 1 | 7.5 | 67.5 | 0 | 0 | 0 | 25.0 | 0.22 | 181 | 328 | 1.8 |
| Terpolymer 2 | 7.5 | 0 | 67.5 | 0 | 0 | 25.0 | 0.10 | 152 | 398 | 2.6 |
| Copolymer 4 | 7.5 | 0 | 0 | 92.5 | 0 | 0 | 0.33 | 81 | 132 | 1.6 |
| Terpolymer 3 | 7.5 | 0 | 0 | 67.5 | 0 | 25.0 | 0.32 | 74 | 122 | 1.6 |
| Copolymer 5 | 12.5 | 0 | 0 | 87.5 | 0 | 0 | 0.57 | 112 | 173 | 1.5 |
| Terpolymer 4 | 12.5 | 0 | 0 | 62.5 | 0 | 25.0 | 0.51 | 142 | 229 | 1.6 |

*the concentration (milliequivalents) of boronic acid (BA) groups in a copolymer is determined by titration Example 6

Co-polymers and terpolymers of VPBA, DMA, PEG$_{200}$MA and MPC, which are prepared in Example 5, are added to the packaging saline solution (consisting of about 0.15 wt % HPMC, about 1.0 wt % PEG400, about 0.294 wt % sodium citrate dihydrate, about 0.19 wt % NaCl, about 1.157 wt % disodium hydrogen phosphate dihydrate, about 0.0034 wt % poloxamer, and about 97.2056 wt % water) at a concentration varying from 0.05-1 wt %. The pH of the packaging saline varies from 8 to 9.5 and the buffer NaH$_2$PO$_4$.2H$_2$O varies from 46 to 92 mmol/L.

PVA contact lenses prepared in Example 2, glycerol-containing SiHy contact lenses prepared in Example 3, and silicon wafers are served as substrates for coating and individually packaged in a polypropylene packaging shell containing about 0.55-0.65 ml of the coating solution prepared above or about 0.65 ml of PBS as control, the shell sealed with an Al foil and autoclaved (30-45 minutes; 121° C.; 2 atmospheres).

The above-treated substrates are removed from the packages and thoroughly rinsed with DI water and then dried. The surface atomic compositions of the dried, treated substrates are analyzed with XPS.

Table 4 shows comparative XPS results both with and without presence of copolymer on both tested lenses and Si wafers. Pure co-polymers without lenses are tested on silicon wafers and tested for surface composition as well.

TABLE 4

| | | Atomic Percentage (by XPS) | | | | | |
|---|---|---|---|---|---|---|---|
| Copolymer | substrate | C | N | O | Si | P | B |
| Terpolymer 3* | None | 64.93 | 1.32 | 31.76 | 0 | 1.32 | 0.68 |
| Terpolymer 4* | None | 65.23 | 1.32 | 31.00 | 0 | 1.32 | 1.13 |
| none | Si wafer | 9 | 0 | 34.67 | 56.16 | 0.17 | 0 |
| Terpolymer 3 | Si wafer | 60.51 | 0.88 | 34.12 | 0.92 | 1.34 | 2.23 |
| Terpolymer 4 | Si wafer | 59.81 | 0.93 | 34.49 | 0.6 | 1.32 | 2.85 |
| None | Lens, Ex. 3 | 61.16 | 4.50 | 23.09 | 10.25 | 0 | 0 |
| Terpolymer 3 (0.1 wt %) | Lens, Ex. 3 | 62.35 | 4.20 | 24.57 | 8.72 | 0.16 | 0 |
| Terpolymer 4 (0.1 wt %) | Lens, Ex. 3 | 62.56 | 3.39 | 25.04 | 8.73 | 0.27 | 0 |
| None | Lens, Ex. 2 | 64.74 | 1.28 | 31.66 | 2.32 | 0 | 0 |
| Terpolymer 3 (0.1 wt %) | Lens, Ex. 2 | 65.22 | 1.63 | 28.55 | 2.18 | 0.59 | 1.83 |
| Terpolymer 3 (0.5 wt %) | Lens, Ex. 2 | 62.92 | 1.20 | 30.35 | 2.57 | 0.85 | 2.11 |

TABLE 4-continued

| Copolymer | substrate | Atomic Percentage (by XPS) | | | | | |
|---|---|---|---|---|---|---|---|
| | | C | N | O | Si | P | B |
| Copolymer 4 (0.5 wt %) | Lens, Ex. 2 | 63.13 | 1.05 | 33.49 | 1.43 | 0 | 0.91 |
| Terpolymer 4 (0.1 wt %) | Lens, Ex. 2 | 62.70 | 1.44 | 31.62 | 1.24 | 0.97 | 2.04 |

*The theoretical values calculated based on the structures of copolymers.

It is found that the phosphorus levels on the PVA lens surface are comparable to both theoretical values and experimental values (Si wafer from the pure copolymer). This indicates incorporation on the lens even after the standard rinsing and drying. Significant boron incorporation is also observed, corroborating the existence of a surface film.

It is also found that phosphorus and boron levels are practically negligible on Glycerol-containing SiHy lenses, indicating little incorporation in the lens. This is likely the result of lower OH concentration on the surface.

It is believed that low levels of Si observed for uncoated and coated PVA contact lenses are due to the an artifact of adventitious silicon contamination in XPS experiments.

Example 7

Copolymer 2 [i.e., poly(VPBA-co-DMA)] prepared in Example 5, Terpolymer 3 [i.e., poly(VPBA-co-PEG$_{200}$MA-co-MPC)] prepared in Example 5, and Terpolymer 4 [i.e., poly(VPBA-co-PEG$_{200}$MA-co-MPC)] prepared in Example 5 are added to the packaging saline solution at a concentration of 1 wt %. The pH of the packaging saline is about 9.0 and the concentration of NaH$_2$PO$_4$.2H$_2$O is about 92 mmol/L.

PVA contact lenses prepared in Example 2 and glycerol-containing SiHy contact lenses prepared in Example 3 are individually packaged in a polypropylene packaging shell containing about 0.65 ml of a packaging saline without any copolymer (control) or with 0.5 wt % of a copolymer prepared above, the shells are sealed with an Al foil and autoclaved (30-45 minutes; 121° C.; 2 atmospheres).

The lubricity (friction rating) and water contact angle (static sessile drop) of the obtained contact lenses are determined directly out-of-pack (OOP) but after >30 min soaking in PBS and reported in Table 5.

TABLE 5

| | Copolymer | Substrate | friction rating | WCA (°) |
|---|---|---|---|---|
| Control (Uncoated PVA lens) | none | Lens, Ex. 2 | 3 | 32 |
| Coated PVA lens | Copolymer 2 | Lens, Ex. 2 | 0.6 | 46 |
| Control (uncoated glycerol-containing SiHy lens) | none | Lens, Ex. 3 | 2 | 90 |
| Coated glycerol-containing SiHy lens | Terpolymer 3 | Lens, Ex. 3 | 1.8 | 46 |
| Coated glycerol-containing SiHy lens | Terpolymer 4 | Lens, Ex. 3 | 1.1 | 53 |

Example 8

Synthesis of Binary and Ternary Copolymers
Poly(MPC$_{0.9}$-co-VPBA$_{0.1}$)

In a 20 ml vial, add 2.66 g (9 mmol) of MPC and 0.148 g (1 mmol) of VPBA and 10 ml Ethanol, vazo 64 1.64 mg (0.01 mmol) are added. Nitrogen gas is gently bubbled into the solution for 5 min to eliminate the oxygen and then the vial is sealed. The polymerization is performed at 60° C. for a 6 hrs. After cooling the vial, the contents are poured into a large amount of a mixture of diethyl ether and chloroform (8/2 by volume) to eliminate any remaining monomer and precipitate the polymer. The precipitate is filtered off using a glass-filter and dried in vacuum.

Poly(MPC$_{0.4}$-co-NVP$_{0.5}$-co-VPBA$_{0.1}$)

In a 20 ml vial, add 1.18 g (4 mmol) of MPC, 0.556 g (5 mmol) of NVP and 0.148 g (1 mmol) of VPBA and 10 ml Ethanol, vazo64 1.64 mg (0.01 mmol) are added. Nitrogen gas is gently bubbled into the solution for 5 min to eliminate the oxygen and then the vial is sealed. The polymerization is performed at 60° C. for a 6 hrs. After cooling the vial, the contents are poured into a large amount of a mixture of diethyl ether and chloroform (8/2 by volume) to eliminate any remaining monomer and precipitate the polymer. The precipitate is filtered off using a glass-filter and dried in vacuum.

Poly(MPC$_{0.6}$-co-BMA$_{0.3}$-co-VPBA$_{0.1}$)

In a 20 ml vial, add 1.77 g (6 mmol) of MPC, 0.426 g (3 mmol) of BMA and 0.148 g (1 mmol) of VPBA and 10 ml Ethanol, vazo64 1.64 mg (0.01 mmol) are added. Nitrogen gas is gently bubbled into the solution for 5 min to eliminate the oxygen and then the vial is sealed. The polymerization is performed at 60° C. for a 6 hrs. After cooling the vial, the contents are poured into a large amount of a mixture of diethyl ether and chloroform (8/2 by volume) to eliminate any remaining monomer and precipitate the polymer. The precipitate is filtered off using a glass-filter and dried in vacuum. The obtained copolymer is determined to have a weight average molecular weight, Mw, of 150 KDa.

Poly(MPC$_{0.8}$-co-BMA$_{0.1}$-co-VPBA$_{0.1}$)

In a 20 ml vial, add 2.36 g (8 mmol) of MPC, 0.142 g (1 mmol) of BMA and 0.148 g (1 mmol) of VPBA and 10 ml Ethanol, vazo64 1.64 mg (0.01 mmol) are added. Nitrogen gas is gently bubbled into the solution for 5 min to eliminate the oxygen and then the vial is sealed. The polymerization was performed at 60° C. for a 6 hrs. After cooling the vial, the contents are poured into a large amount of a mixture of diethyl ether and chloroform (8/2 by volume) to eliminate any remaining monomer and precipitate the polymer. The precipitate is filtered off using a glass-filter and dried in vacuum. The obtained copolymer is determined to have a weight average molecular weight, Mw, of 160 KDa.

Poly(MPC$_{0.8}$-co-BMA$_{0.1}$-co-VPBA$_{0.1}$)

In a 40 ml vial, add 4.72 g (16 mmol) of MPC, 0.285 g (2 mmol) of BMA and 0.296 g (2 mmol) of VPBA and 20 ml Ethanol, vazo64 3.2 mg (0.02 mmol) are added. Nitrogen gas is gently bubbled into the solution for 5 min to eliminate the oxygen and then the vial is sealed. The polymerization is performed at 60° C. for a 6 hrs. After cooling the vial, the contents are poured into a large amount of a mixture of diethyl ether and chloroform (8/2 by volume) to eliminate any remaining monomer and precipitate the polymer. The precipitate is filtered off using a glass-filter and dried in vacuum. The obtained copolymer is determined to have a weight average molecular weight, Mw, of 286 KDa.

Poly($MPC_{0.8}$-Co-$BMA_{0.1}$-co-$VPBA_{0.1}$)

In a 40 ml vial, add 4.72 g (16 mmol) of MPC, 0.285 g (2 mmol) of BMA and 0.296 g (2 mmol) of VPBA and 20 ml Ethanol, vazo64 1.3 mg (0.01 mmol) are added. Nitrogen gas is gently bubbled into the solution for 5 min to eliminate the oxygen and then the vial is sealed. The polymerization is performed at 60° C. for a 6 hrs. After cooling the vial, the contents are poured into a large amount of a mixture of diethyl ether and chloroform (8/2 by volume) to eliminate any remaining monomer and precipitate the polymer. The precipitate is filtered off using a glass-filter and dried in vacuum. The obtained copolymer is determined to have a weight average molecular weight, Mw, of 386 KDa.

Poly($MPC_{0.8}$-co-$BMA_{0.1}$-co-$VPBA_{0.1}$)

In a 40 ml vial, add 4.72 g (16 mmol) of MPC, 0.285 g (2 mmol) of BMA and 0.296 g (2 mmol) of VPBA and 10 ml Ethanol, vazo64 3.2 mg (0.02 mmol) are added. Nitrogen gas is gently bubbled into the solution for 5 min to eliminate the oxygen and then the vial is sealed. The polymerization is performed at 60° C. for a 6 hrs. After cooling the vial, the contents are poured into a large amount of a mixture of diethyl ether and chloroform (8/2 by volume) to eliminate any remaining monomer and precipitate the polymer. The precipitate is filtered off using a glass-filter and dried in vacuum. The obtained copolymer is determined to have a weight average molecular weight, Mw, of 688 KDa.

Preparation of Packaging Salines

Phosphate-Buffered Saline (PBS) PBS is prepared by dissolving all the required components to have the following composition: about 0.044 wt. % $NaH_2PO_4 \cdot H_2O$, about 0.388 wt. % $Na_2HPO_4 \cdot 2H_2O$, and about 0.79 wt. % NaCl and; pH 7.2±0.2 at 25° C.

Basis Packaging Saline (BPS)

The basis saline is prepared by dissolving all the required components to have the following composition: about 0.15 wt % HPMC, about 1.0 wt % PEG400, about 0.294 wt % sodium citrate dihydrate, about 0.19 wt % NaCl, about 1.157 wt % disodium hydrogen phosphate dihydrate, about 0.0034 wt % poloxamer, and about 97.2056 wt % water).

Testing Packaging Saline (TPS)

Several testing packaging solutions (TPS1-TPS8) are prepared by dissolving a copolymer prepared above in the BPS prepared above to have the following compositions shown in Table 6.

TABLE 6

| | Composition (wt %) | | | | | | | |
|---|---|---|---|---|---|---|---|---|
| | TPS1 | TPS2 | TPS3 | TPS4 | TPS5 | TPS6 | TPS7 | TPS8 |
| BPS | 99.85 | 99.85 | 99.85 | 99.85 | 99.70 | 99.85 | 99.85 | 99.85 |
| Poly($MPC_{0.9}$-$VPBA_{0.1}$) | 0.15 | — | — | — | — | — | — | — |
| Poly($MPC_{0.4}$-$NVP_{0.5}$-$VPBA_{0.1}$) | — | 0.15 | — | — | — | — | — | — |
| Poly($MPC_{0.6}$-$BMA_{0.3}$-$VPBA_{0.1}$) Mw 150 KDa | — | — | 0.15 | — | — | — | — | — |
| Poly($MPC_{0.8}$-$BMA_{0.1}$-$VPBA_{0.1}$) Mw 160 KDa | — | — | — | 0.15 | 0.30 | — | — | — |
| Poly($MPC_{0.8}$-$BMA_{0.1}$-$VPBA_{0.1}$) Mw 286 KDa | — | — | — | — | — | 0.15 | — | — |
| Poly($MPC_{0.8}$-$BMA_{0.1}$-$VPBA_{0.1}$) Mw 386 KDa | — | — | — | — | — | — | 0.15 | — |
| Poly($MPC_{0.8}$-$BMA_{0.1}$-$VPBA_{0.1}$) Mw 688 KDa | — | — | — | — | — | — | — | 0.15 |

Lens Preparation and Packaging:

PVA contact lenses prepared in Example 2 are individually packaged in a polypropylene packaging shell containing about 0.65 ml of a packaging saline (one of PBS, BPS, and TPS1-TPS8 prepared above), the shells are sealed with an Al foil and autoclaved (30-45 minutes; 121° C.; 2 atmospheres).

The lubricity (friction rating) of the obtained contact lenses are determined directly out-of-pack (OOP) but after being soaked in PBS for at least about 30 minutes and the results are reported in Table 7.

The autoclaved lenses are removed from the packages and desalinated, and then dried at room temperature. Desalination is performed by rinsing the lenses in 3 successive washes in DI water for a minimum of 10 minutes per wash. The lenses are then placed in a room temperature desiccator with flowing nitrogen for a minimum of 12 hours to achieve sufficient dryness for XPS. Samples are loaded into a Sage-Sun XPS (10 kV source, 0.2 eV step size, 20 eV pass energy, 3 mm spot size) for surface elemental analysis. The phosphorus atomic percentage on the lens surface are reported in Table 7. The detection of phosphorus by XPS indicates the presence of a layer of MPC-containing copolymer on the surface of the lens.

TABLE 7

| | PBS | BPS | TPS1 | TPS2 | TPS3 | TPS4 | TPS5 | TPS6 | TPS7 | TPS8 |
|---|---|---|---|---|---|---|---|---|---|---|
| Friction Rating | 4 | 3 | 3 | 3 | 2 | 2 | 2 | 2 | 1.5 | 1.5 |
| % by XPS | n/a | 0 | n/a | n/a | n/a | 1.37 | n/a | 0.99 | 1.16 | 1.26 |

Example 9

Synthesis of Binary and Ternary Copolymers

Add 2-methacryloyloxyethyl phosphorylcholine (MPC) (Mw=295.27), 4-vinyl phenyl boronic acid (VPBA, Mw=147.97), and optionally a third monomer (n-butyl methacrylate (BMA, Mw=142.20) or di(ethylene glycol) methyl ether methacrylate (DGMEMA, Mw=188.22), ethanol, and DI water into a 1 L jacketed reactor, in the amounts shown in Table 8. Degas the solution for 30 minutes at a nitrogen flow rate of 250 mL/min. Dissolve Vazo-56 into 20 to 30 g of DI water. Degas the initiator solution for 30 minutes at a nitrogen flow rate of about 50 mL/min. in an addition funnel. Heat the solution in the reactor to 49° C. Add initiator solution and maintain solution temperature for 16 hours.

Purification:

Dilute solution after the reaction to about 10% solids with DI water. Filter solution from synthesis step through a course-fritted filter. Dilute solution to 7.5-5.0% solids for purification by ultrafiltration using a polyether sulfone membrane with 30 kDa molecular weight cutoff. Use 8 to 10 bed volumes of water to remove residual monomer and solvent.

Polymer Characterization:

The boronic acid content of the copolymer is determined by carrying an acid base titration in the presence of mannitol. The results are reported in Table 8.

The weight average molecular weight of the copolymers are determined using GPC with an RI detector and PEG standards. The results are reported in Table 8.

TABLE 8

| | Synthesis | | | |
|---|---|---|---|---|
| Components | Copolymer 9A | Copolymer 9B | Copolymer 9C | Copolymer 9D |
| MPC (g) | 66.80 | 59.03 | 158.21 | 71.09 |
| VPBA (g) | 4.187 | 3.696 | 9.908 | 3.956 |
| BMA (g) | 4.023 | — | — | — |
| DGMEMA (g) | — | 4.702 | 12.606 | — |
| Vazo-56 (g) | 0.0768 | 0.0679 | 0.1818 | 0.0729 |
| Ethanol (g) | 212.5 | 191 | 257.1 | 170.0 |
| Water (g) | 212.5 | 191 | 257.1 | 255 |
| Mw (kDa) | 993 | 579 | 2,176 | 1,227 |
| Mn (kDa) | 317 | 148 | 460 | 403 |
| PDI (Mw/Mn) | 3.1 | 4.0 | 4.7 | 3.2 |
| Boronic acid (meq/g) | 0.341 | 0.495 | 0.325 | 0.306 |

Example 10

Preparation of Packaging Salines

The phosphate-buffered saline (PBS) and the basic packaging saline (BPS) prepared in Example 8 are used in this example.

Fourteen testing packaging solutions (TPS1-TPS8) are prepared by dissolving one of Copolymers 9A to 9D prepared in Example 9 in the BPS prepared in Example 8 to have the following compositions shown in Table 9.

TABLE 9

| | [VPB Copolymer] (wt %) | | | |
|---|---|---|---|---|
| TPS ID | Copolymer 9A | Copolymer 9B | Copolymer 9C | Copolymer 9D |
| 9A-0.1 | 0.1 | | | |
| 9A-0.08 | 0.08 | | | |
| 9A-0.05 | 0.05 | | | |
| 9A-0.03 | 0.03 | | | |
| 9A-0.02 | 0.02 | | | |
| 9A-0.01 | 0.01 | | | |
| 9B-0.1 | | 0.1 | | |
| 9C-0.1 | | | 0.1 | |
| 9C-0.08 | | | 0.08 | |
| 9C-0.05 | | | 0.05 | |
| 9C-0.03 | | | 0.03 | |
| 9C-0.02 | | | 0.02 | |
| 9C-0.01 | | | 0.01 | |
| 9D-0.1 | | | | 0.1 |

Lens Preparation and Packaging:

PVA contact lenses prepared in Example 2 are individually packaged in a polypropylene packaging shell containing about 0.65 ml of a packaging saline (one of the basic packaging saline and the 14 testing packaging salines prepared above), the shells are sealed with an Al foil and autoclaved (30-45 minutes; 121° C.; 2 atmospheres).

The lubricity (friction rating) of the obtained contact lenses are determined directly out-of-pack (designated as "OOP") and after being soaked in PBS for at least about 30 minutes (designated as "PBS") and the results are reported in Table 10.

The autoclaved lenses are removed from the packages and desalinated, and then dried at room temperature. Desalination is performed by rinsing the lenses in 3 successive washes in DI water for a minimum of 10 minutes per wash. The lenses are then placed in a room temperature desiccator with flowing nitrogen for a minimum of 12 hours to achieve sufficient dryness for XPS. Samples are loaded into a Sage-Sun XPS (10 kV source, 0.2 eV step size, 20 eV pass energy, 3 mm spot size) for surface elemental analysis. The phosphorus atomic percentage on the lens surface are reported in Table 10. The detection of phosphorus by XPS indicates the presence of a layer of MPC-containing copolymer on the surface of the lens.

TABLE 10

| | Friction Rating | | |
|---|---|---|---|
| Packaging Saline | OOP | PBS | % P by XPS |
| Basic Packaging Saline | 3.0 | 3.0 | 0 |
| TPS 9A-0.1 | 0.6 | 0.7 | 2.1 |
| TPS 9A-0.08 | 1.1 | 1.7 | 1.7 |
| TPS 9A-0.05 | 1.8 | 2.2 | 1.4 |
| TPS 9A-0.03 | 2.0 | 2.5 | 1.6 |
| TPS 9A-0.02 | 2.7 | 3.0 | 1.2 |
| TPS 9A-0.01 | 2.8 | 3.0 | 0.6 |
| TPS 9B-0.1 | 0.9 | 0.8 | 1.1 |
| TPS 9C-0.1 | 2.5 | 2.7 | 1.1 |
| TPS 9C-0.08 | 2.3 | 2.5 | 0.9 |
| TPS 9C-0.05 | 2.5 | 2.8 | 0.9 |
| TPS 9C-0.03 | 2.7 | 3.0 | 0.8 |
| TPS 9C-0.02 | 2.7 | 3.0 | 0.7 |
| TPS 9C-0.01 | 2.7 | 3.0 | 0.3 |
| TPS 9D-0.1 | 2.5 | 2.7 | 1.3 |

Example 11

Binary and Ternary Copolymers

Binary and ternary copolymers are synthesized from a reactive composition shown in Table 11, according to the procedures described in Example 9, except that the polymerization reaction is carried out at 52° C. The resultant copolymer are purified and characterized according to the procedures described in Example 9. The results are reported in Table 11.

TABLE 11

| Formulation | 11A | 11B | 11C |
|---|---|---|---|
| MPC (g) | 55.7 | 52.9 | 54.7 |
| VPBA (g) | 3.49 | 3.30 | 3.43 |
| BMA (g) | 3.35 | — | — |
| DGMEMA (g) | — | — | 4.36 |
| Vazo-56 (g) | 0.064 | 0.060 | 0.063 |
| Ethanol (g) | 218.7 | 218.7 | 218.7 |
| Water (g) | 218.7 | 218.7 | 218.7 |

TABLE 11-continued

| Formulation | 11A | 11B | 11C |
| --- | --- | --- | --- |
| Mw (kDa) | 623 | 913 | 705 |
| Boronic acid (meq/g) | 0.344 | 0.304 | 0.327 |

All the publications, patents, and patent application publications, which have been cited herein above in this application, are hereby incorporated by reference in their entireties.

What is claimed is:

1. A soft contact lens, comprising:
a hydrogel lens body and a coating thereon, wherein the hydrogel lens body comprises or is made of a polymeric material having 1,2- and/or 1,3-diol moieties, wherein the coating comprises a layer of a hydrophilic copolymer comprising (a) arylborono-containing repeating units each having a boronic acid group and (b) repeating units of at least one hydrophilic vinylic monomer, wherein said at least one hydrophilic vinylic monomer comprises a phosphorylcholine-containing vinylic monomer,
wherein the coating is covalent attached onto the hydrogel lens body through linkages each formed between one of the boronic acid groups of the hydrophilic copolymer and one of the 1,2-diol and 1,3-diol moieties of the polymeric material.

2. The soft contact lens of claim 1, wherein the soft contact lens has a friction rating of about 2.5 or lower.

3. The soft contact lens of claim 2, wherein the soft contact lens has an equilibrium water content of from about 15% to about 80% by weight at a temperature of from about 22° C. to 28° C., and/or an elastic modulus of from about 0.2 MPa to about 1.5 MPa when being fully hydrated.

4. The soft contact lens of claim 3, wherein the hydrogel lens body comprises or is made of a polymeric material comprising at least 50% by mole of repeating units of vinyl alcohol.

5. The soft contact lens of claim 4, wherein the hydrogel lens body comprises or is made of a polymeric material which is a polymerization product of a water-soluble, actinically-crosslinkable polyvinylalcohol prepolymer which comprises: repeating units of vinyl alcohol and repeating units of formula (I)

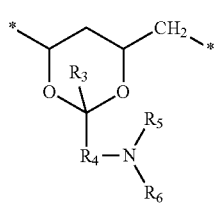

(I)

in which:
$R_3$ is hydrogen or a $C_1$-$C_6$ alkyl group;
$R_4$ is a $C_1$-$C_6$ alkylene divalent radical;
$R_5$ is hydrogen or $C_1$-$C_6$ alkyl;
$R_6$ is an ethylenically unsaturated group of

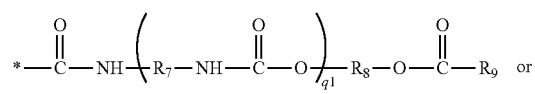

or

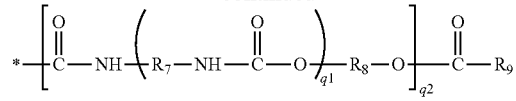

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

6. The soft contact lens of claim 5, wherein the polyvinylalcohol prepolymer has a weight average molecular weight of at least about 2,000 Daltons, and comprises from about 1% to about 25% by mole of the repeating units of formula (I).

7. The soft contact lens of claim 5, wherein the arylborono-containing repeating units is derived from at least one arylborono-containing vinylic monomer of formula (II)

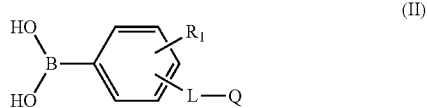

(II)

in which:
$R_1$ is H, $NO_2$, F, Cl, or $CF_3$; Q is a monovalent radical of

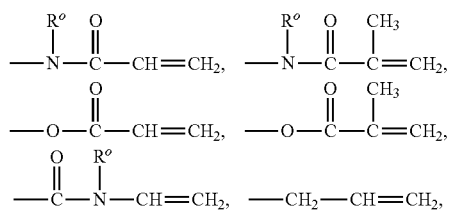

or —CH═$CH_2$; L is a direct bond, a $C_1$-$C_4$ alkylene divalent radical, a divalent radical of

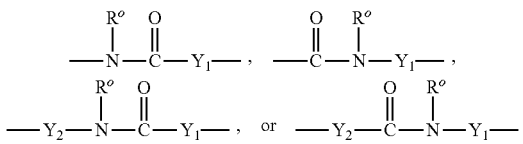

in which $Y_1$ is CH(OH) or a $C_1$-$C_4$ alkylene divalent radical, $Y_2$ is a $C_1$-$C_4$ alkylene divalent radical, and $R^o$ is H or a $C_1$-$C_4$ alkyl.

8. The soft contact lens of claim 5, wherein the arylborono-containing repeating units is derived from at least one arylborono-containing vinylic monomer selected from the group consisting of 3-vinylphenylboronic acid, 4-vinylboronic acid, 3-(meth)acrylamidophenylboronic acid, 4-(meth)acrylamidophenylboronic acid, and combinations thereof.

9. The soft contact lens of claim 5, wherein the arylborono-containing repeating units is derived from at least one arylborono-containing vinylic monomer selected from the group consisting of a reaction production of an amino-containing phenylboronic acid derivative with (meth)acrylic acid halide, a reaction product of an amino-containing phenylboronic acid derivative with a carboxy-containing vinylic monomer in the presence of a carbodiimide and N-hydroxysuccinimide, a reaction production of a carboxy-containing phenylboronic acid derivative with an amino-containing vinylic monomer in the presence of a carbodiimide and N-hydroxysuccinimide, and combinations thereof, wherein the carboxy-containing phenylboronic acid derivative is selected from the group consisting of 3-carboxyphenylboronic acid, 4-carboxyphenylboronic acid, 3-boronophenylacetic acid, 4-boronophenylacetic acid, 2-(4-boronophenyl)-2-methylpropanoic acid, 3-(4-boronophenyl)propanoic acid, 3-(3-boronophenyl)propanoic acid, 5-(3-boronophenyl)pentanoic acid, 5-(4-boronophenyl)pentanoic acid, 4-(2-carboxyethyl)-3-nitrophenylboronic acid, 3-(3-carboxypropyonylamino) phenylboronic acid, 3-amino-3-(4-boronophenyl)propanoic acid, and combinations thereof, wherein the amino-containing phenylboronic acid derivative is selected from the group consisting of 3-aminophenylboronic acid, 4-aminophenylboronic acid, 4-amino-3-nitrophenylboronic acid, 4-amino-4-fluorophenylboronic acid, 2-(aminomethyl)-5-nitrophenylboronic acid, 3-(aminomethyl)-phenylboronic acid, 3-amino-5-nitrophenylboronic acid, 3-amino-3-(4-boronophenyl)propanoic acid, and combinations thereof,
  wherein the carboxy-containing vinylic monomer is selected from the group consisting of 2-acrylamidoglycolic acid, 3-acrylamidopropionic acid, 4-acrylamidobutanoic acid, 5-acrylamidopentanoic acid, 3-acryloyloxypropanoic acid, 4-acryloyloxybutanoic acid, 5-acryloyloxypentanoic acid, and combinations thereof,
  wherein the amino-containing vinylic monomers is selected from the group consisting of amino-$C_2$-$C_4$ alkyl (meth)acrylate, $C_1$-$C_3$ alkylamino-$C_2$-$C_4$ alkyl (meth)acrylate, amino-$C_2$-$C_4$ alkyl (meth)acrylamide, $C_1$-$C_3$ alkylamino-$C_2$-$C_4$ alkyl (meth)acrylamide, vinylamine, allylamine, and combinations thereof.

10. The soft contact lens of claim 5, wherein said at least one hydrophilic vinylic monomer further comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth) acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, N-2-aminoethyl (meth) acrylamide, N-2-methylaminoethyl (meth)acrylamide, N-2-ethylaminoethyl (meth)acrylamide, N-2-dimethylaminoethyl (meth)acrylamide, N-3-aminopropyl (meth) acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, ethylene glycol methyl ether (meth)acrylate, di(ethylene glycol) methyl ether (meth)acrylate, tri (ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, allyl alcohol, ethylene glycol monoallyl ether, di(ethylene glycol) monoallyl ether, tri(ethylene glycol) monoallyl ether, tetra(ethylene glycol) monoallyl ether, poly (ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, N-2-hydroxyethyl vinyl carbamate, N-carboxyvinyl-β-alanine, N-carboxyvinyl-α-alanine, and combinations thereof.

11. The soft contact lens of claim 5, wherein the hydrophilic copolymer comprises (a) from about 1% to about 20% by mole of the arylborono-containing repeating units, (b) from about 60% to about 98% by mole of repeating units of at least one phosphorylcholine-containing vinylic monomer, and (c) from about 1% by mole to about 20% by mole of acrylic monomeric units of at least one acrylic monomer having 3 to 16 carbon atoms, provided that the sum of the mole percentages of components (a), (b) and (c) and other components not listed above is 100%.

12. The soft contact lens of claim 11, wherein said at least one acrylic monomer is selected from the group consisting of a $C_1$-$C_{12}$ alkyl (meth)acrylate, a hydroxy-substituted $C_2$-$C_{12}$ alkyl (meth)acrylate, a carboxy-substituted $C_2$-$C_{12}$ alkyl (meth)acrylate, an $NH_2$-substituted $C_2$-$C_{12}$ alkyl (meth)acrylate, a methylamino-substituted $C_2$-$C_{12}$ alkyl (meth)acrylate, a dimethylamino-substituted $C_2$-$C_{12}$ alkyl (meth)acrylate, an ethylamino-substituted $C_2$-$C_{10}$ alkyl (meth)acrylate, a diethylamino-substituted $C_2$-$C_8$ alkyl (meth)acrylate, a $C_2$-$C_{12}$ alkyl (meth)acrylamide, a hydroxy-substituted $C_2$-$C_{12}$ alkyl (meth)acrylamide, a carboxy-substituted $C_2$-$C_{12}$ alkyl (meth)acrylamide, an $NH_2$-substituted $C_2$-$C_{12}$ alkyl (meth)acrylamide, a methylamino-substituted $C_2$-$C_{12}$ alkyl (meth)acrylamide, a dimethylamino-substituted $C_2$-$C_{12}$ alkyl (meth)acrylamide, an ethylamino-substituted $C_2$-$C_{10}$ alkyl (meth)acrylamide, a diethylamino-substituted $C_2$-$C_8$ alkyl (meth)acrylamide, ethylene glycol (meth)acrylate, di(ethylene glycol) (meth)acrylate, tri(ethylene glycol) (meth)acrylate, tetra(ethylene glycol) (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, and combinations thereof.

13. The soft contact lens of claim 11, wherein the phosphorylcholine-containing vinylic monomer is selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

14. The soft contact lens of claim 5, wherein the hydrophilic copolymer comprises (a) from about 0.5% by mole to about 25% by mole of the arylborono-containing repeating units and (b) from about 75% by mole to about 99.5% by mole of the repeating units of said at least one hydrophilic vinylic monomer, provided that the sum of the mole percentages of components (a) and (b) and other components not listed above is 100%.

15. A soft contact lens, comprising:
a hydrogel lens body and a coating thereon,
wherein the hydrogel lens body comprises or is made of a polymeric material having 1,2- and/or 1,3-diol moieties, wherein the polymeric material comprises repeating units of at least one diol-containing vinylic monomer, and/or repeating units of at least one diol-containing vinylic crosslinker, wherein the coating comprises a layer of a hydrophilic copolymer comprising (a) arylborono-containing repeating units each having a boronic acid group and (b) repeating units of at least one hydrophilic vinylic monomer, wherein the coating is covalent attached onto the hydrogel lens body through linkages each formed between one of the boronic acid groups of the hydrophilic copolymer and one of the 1,2-diol and 1,3-diol moieties of the polymeric material.

16. The soft contact lens of claim 15, wherein said at least one diol-containing vinylic monomer is selected from the group consisting of N-2,3-dihydroxypropyl (meth)acrylamide, N-tris(hydroxymethyl)methyl (meth)acrylamide, 2-gluconamidoethyl (meth)acrylamide, 3-gluconamidopropyl (meth)acrylamide, glycerol (meth)acrylate, glucosyl (meth)acrylate, glucosyloxyethyl (meth)acrylate, 3-allyoxy-1,2-propanediol, 2-allyloxymethyl-2-(hydroxymethyl)-1,3-propanediol, 2-allyloxymethyl-2-ethyl-1,3-propanediol, allyl α-D-mannopyranoside, allyl α-D-galactopyranoside, allyl 6-deoxyhexopyranoside, allyl 6-deoxy-2-O-methylhexopyranoside, and combinations thereof.

17. The soft contact lens of claim 15, wherein said at least one diol-containing vinylic crosslinker is selected from the group consisting of N,N'-(1,2-dihydroxyethylene)bis-(meth)acrylamide, N,N'-(2,3-dihydroxybutylene)bis-(meth)acrylamide, a polydimethylsiloxane vinylic crosslinkers comprising siloxane units each having one methyl substituent and one diol-containing substituent, and combinations thereof.

18. The soft contact lens of claim 15, wherein the arylborono-containing repeating units is derived from at least one arylborono-containing vinylic monomer of formula (II)

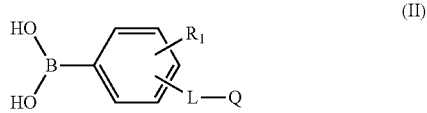

(II)

in which:
$R_1$ is H, $NO_2$, F, Cl, or $CF_3$; Q is a monovalent radical of

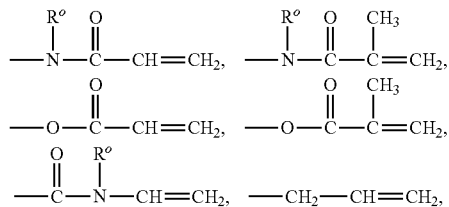

or $-CH=CH_2$; L is a direct bond, a $C_1$-$C_4$ alkylene divalent radical, a divalent radical of

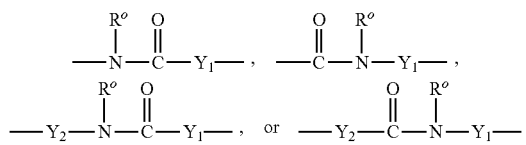

in which $Y_1$ is CH(OH) or a $C_1$-$C_4$ alkylene divalent radical, $Y_2$ is a $C_1$-$C_4$ alkylene divalent radical, and $R°$ is H or a $C_1$-$C_4$ alkyl.

19. The soft contact lens of claim 15, wherein the arylborono-containing repeating units is derived from at least one arylborono-containing vinylic monomer selected from the group consisting of 3-vinylphenylboronic acid, 4-vinylboronic acid, 3-(meth)acrylamidophenylboronic acid, 4-(meth)acrylamidophenylboronic acid, and combinations thereof.

20. The soft contact lens of claim 15, wherein the arylborono-containing repeating units is derived from at least one arylborono-containing vinylic monomer selected from the group consisting of a reaction production of an amino-containing phenylboronic acid derivative with (meth)acrylic acid halide, a reaction product of an amino-containing phenylboronic acid derivative with a carboxy-containing vinylic monomer in the presence of a carbodiimide and N-hydroxysuccinimide, a reaction production of a carboxy-containing phenylboronic acid derivative with an amino-containing vinylic monomer in the presence of a carbodiimide and N-hydroxysuccinimide, and combinations thereof, wherein the carboxy-containing phenylboronic acid derivative is selected from the group consisting of 3-carboxyphenylboronic acid, 4-carboxyphenylboronic acid, 3-boronophenylacetic acid, 4-boronophenylacetic acid, 2-(4-boronophenyl)-2-methylpropanoic acid, 3-(4-boronophenyl)propanoic acid, 3-(3-boronophenyl) propanoic acid, 5-(3-boronophenyl)pentanoic acid, 5-(4-boronophenyl)pentanoic acid, 4-(2-carboxyethyl)-3-nitrophenylboronic acid, 3-(3-carboxypropyonylamino) phenylboronic acid, 3-amino-3-(4-boronophenyl)propanoic acid, and combinations thereof, wherein the amino-containing phenylboronic acid derivative is selected from the group consisting of 3-aminophenylboronic acid, 4-aminophenylboronic acid, 4-amino-3-nitrophenylboronic acid, 4-amino-4-fluorophenylboronic acid, 2-(aminomethyl)-5-nitrophenylboronic acid, 3-(aminomethyl)-phenylboronic acid, 3-amino-5-nitrophenylboronic acid, 3-amino-3-(4-boronophenyl)propanoic acid, and combinations thereof, wherein the carboxy-containing vinylic monomer is selected from the group consisting of 2-acrylamidoglycolic acid, 3-acrylamidopropionic acid, 4-acrylamidobutanoic acid, 5-acrylamidopentanoic acid, 3-acryloyloxypropanoic acid, 4-acryloyloxybutanoic acid, 5-acryloyloxypentanoic acid, and combinations thereof, wherein the amino-containing vinylic monomers is selected from the group consisting of amino-$C_2$-$C_4$ alkyl (meth) acrylate, $C_1$-$C_3$ alkylamino-$C_2$-$C_4$ alkyl (meth)acrylate, amino-$C_2$-$C_4$ alkyl (meth)acrylamide, $C_1$-$C_3$ alkylamino-$C_2$-$C_4$ alkyl (meth)acrylamide, vinylamine, allylamine, and combinations thereof.

21. The soft contact lens of claim 15, wherein the hydrophilic copolymer comprises (a) from about 0.5% by mole to about 25% by mole of the arylborono-containing repeating units and (b) from about 75% by mole to about 99.5% by mole of the repeating units of said at least one hydrophilic vinylic monomer, provided that the sum of the mole percentages of components (a) and (b) and other components not listed above is 100%.

22. The soft contact lens of claim 15, wherein said at least one hydrophilic vinylic monomer comprises a phosphorylcholine-containing vinylic monomer.

23. The soft contact lens of claim 22, wherein said at least one hydrophilic vinylic monomer further comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth) acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, N-2-aminoethyl (meth) acrylamide, N-2-methylaminoethyl (meth)acrylamide, N-2-ethylaminoethyl (meth)acrylamide, N-2-dimethylaminoethyl (meth)acrylamide, N-3-aminopropyl (meth) acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, ethylene glycol methyl ether (meth)acrylate, di(ethylene glycol) methyl ether (meth)acrylate, tri (ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, allyl alcohol, ethylene glycol monoallyl ether, di(ethylene glycol) monoallyl ether, tri(ethylene glycol) monoallyl ether, tetra(ethylene glycol) monoallyl ether, poly (ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, N-2-hydroxyethyl vinyl carbamate, N-carboxyvinyl-β-alanine (VINAL), N-carboxyvinyl-α-alanine, and combinations thereof.

24. The soft contact lens of claim 15, wherein the hydrophilic copolymer comprises (a) from about 1% to about 20% by mole of the arylborono-containing repeating units, (b) from about 60% to about 98% by mole of repeating units of at least one phosphorylcholine-containing vinylic monomer, and (c) from about 1% by mole to about 20% by mole of acrylic monomeric units of at least one acrylic monomer having 3 to 16 carbon atoms, provided that the sum of the mole percentages of components (a), (b) and (c) and other components not listed above is 100%.

25. The soft contact lens of claim 24, wherein said at least one acrylic monomer is selected from the group consisting of a $C_1$-$C_{12}$ alkyl (meth)acrylate, a hydroxy-substituted $C_2$-$C_{12}$ alkyl (meth)acrylate, a carboxy-substituted $C_2$-$C_{12}$ alkyl (meth)acrylate, an $NH_2$-substituted $C_2$-$C_{12}$ alkyl (meth)acrylate, a methylamino-substituted $C_2$-$C_{12}$ alkyl (meth)acrylate, a dimethylamino-substituted $C_2$-$C_{12}$ alkyl (meth)acrylate, an ethylamino-substituted $C_2$-$C_{10}$ alkyl (meth)acrylate, a diethylamino-substituted $C_2$-$C_8$ alkyl (meth)acrylate, a $C_2$-$C_{12}$ alkyl (meth)acrylamide, a hydroxy-substituted $C_2$-$C_{12}$ alkyl (meth)acrylamide, a carboxy-substituted $C_2$-$C_{12}$ alkyl (meth)acrylamide, an $NH_2$-substituted $C_2$-$C_{12}$ alkyl (meth)acrylamide, a methylamino-substituted $C_2$-$C_{12}$ alkyl (meth)acrylamide, a dimethylamino-substituted $C_2$-$C_{12}$ alkyl (meth)acrylamide, an ethylamino-substituted $C_2$-$C_{10}$ alkyl (meth)acrylamide, a diethylamino-substituted $C_2$-$C_8$ alkyl (meth)acrylamide, ethylene glycol (meth)acrylate, di(ethylene glycol) (meth)acrylate, tri(ethylene glycol) (meth)acrylate, tetra(ethylene glycol) (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, and combinations thereof.

26. The soft contact lens of claim 15, wherein said at least one hydrophilic vinylic monomer comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth) acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, allyl alcohol, ethylene glycol monoallyl ether, di(ethylene glycol) monoallyl ether, tri(ethylene glycol) monoallyl ether, tetra(ethylene glycol) monoallyl ether, poly (ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, N-2-hydroxyethyl vinyl carbamate, N-carboxyvinyl-β-alanine (VINAL), N-carboxyvinyl-α-alanine, and combinations thereof.

27. The soft contact lens of claim 1, wherein the arylborono-containing repeating units is derived from at least one arylborono-containing vinylic monomer of formula (II)

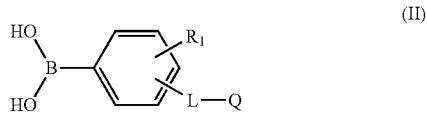

in which:

$R_1$ is H, $NO_2$, F, Cl, or $CF_3$; Q is a monovalent radical of

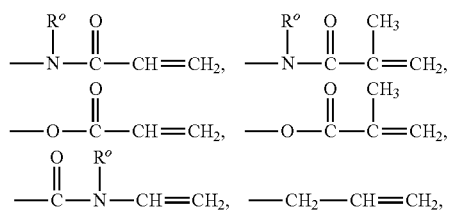

or —CH=$CH_2$; L is a direct bond, a $C_1$-$C_4$ alkylene divalent radical, a divalent radical of

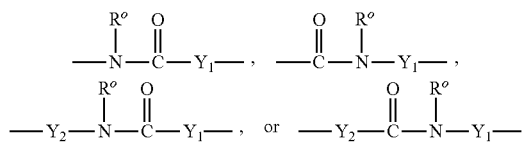

in which $Y_1$ is CH(OH) or a $C_1$-$C_4$ alkylene divalent radical, $Y_2$ is a $C_1$-$C_4$ alkylene divalent radical, and $R^o$ is H or a $C_1$-$C_4$ alkyl.

28. The soft contact lens of claim 1, wherein the arylborono-containing repeating units is derived from at least one arylborono-containing vinylic monomer selected from the group consisting of a reaction production of an amino-containing phenylboronic acid derivative with (meth)acrylic acid halide, a reaction product of an amino-containing phenylboronic acid derivative with a carboxy-containing vinylic monomer in the presence of a carbodiimide and N-hydroxysuccinimide, a reaction production of a carboxy-containing phenylboronic acid derivative with an amino-containing vinylic monomer in the presence of a carbodiimide and N-hydroxysuccinimide, and combinations thereof, wherein the carboxy-containing phenylboronic acid derivative is selected from the group consisting of 3-carboxyphenylboronic acid, 4-carboxyphenylboronic acid, 3-boronophenylacetic acid, 4-boronophenylacetic acid, 2-(4-boronophenyl)-2-methylpropanoic acid, 3-(4-boronophenyl)propanoic acid, 3-(3-boronophenyl)propanoic acid, 5-(3-boronophenyl)pentanoic acid, 5-(4-boronophenyl)pentanoic acid, 4-(2-carboxyethyl)-3-nitrophenylboronic acid, 3-(3-carboxypropyonylamino)phenylboronic acid, 3-amino-3-(4-boronophenyl)propanoic acid, and combinations thereof,
- wherein the amino-containing phenylboronic acid derivative is selected from the group consisting of 3-aminophenylboronic acid, 4-aminophenylboronic acid, 4-amino-3-nitrophenylboronic acid, 4-amino-4-fluorophenylboronic acid, 2-(aminomethyl)-5-nitrophenylboronic acid, 3-(aminomethyl)-phenylboronic acid, 3-amino-5-nitrophenylboronic acid, 3-amino-3-(4-boronophenyl)propanoic acid, and combinations thereof,
- wherein the carboxy-containing vinylic monomer is selected from the group consisting of 2-acrylamidoglycolic acid, 3-acrylamidopropionic acid, 4-acrylamidobutanoic acid, 5-acrylamidopentanoic acid, 3-acryloyloxypropanoic acid, 4-acryloyloxybutanoic acid, 5-acryloyloxypentanoic acid, and combinations thereof,
- wherein the amino-containing vinylic monomers is selected from the group consisting of amino-$C_2$-$C_4$ alkyl (meth)acrylate, $C_1$-$C_3$ alkylamino-$C_2$-$C_4$ alkyl (meth)acrylate, amino-$C_2$-$C_4$ alkyl (meth)acrylamide, $C_1$-$C_3$ alkylamino-$C_2$-$C_4$ alkyl (meth)acrylamide, vinylamine, allylamine, and combinations thereof.

29. The soft contact lens of claim 1, wherein said at least one hydrophilic vinylic monomer further comprises at least one vinylic monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, 2-hydroxyethyl (meth)acrylate, 3-hydroxypropyl (meth)acrylate, 2-hydroxypropyl (meth)acrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, 2-(meth)acrylamidoglycolic acid, (meth)acrylic acid, ethylacrylic acid, propylacrylic acid, 3-(meth)acrylamidopropionic acid, 4-(meth)acrylamidobutanoic acid, 5-(meth)acrylamidopentanoic acid, 3-(meth)acryloyloxypropanoic acid, 4-(meth)acryloyloxybutanoic acid, 5-(meth)acryloyloxypentanoic acid, N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, N-2-hydroxyethyl vinyl carbamate, N-carboxyvinyl-β-alanine, N-carboxyvinyl-α-alanine, and combinations thereof.

30. The soft contact lens of claim 1, wherein the hydrophilic copolymer comprises (a) from about 1% to about 20% by mole of the arylborono-containing repeating units, (b) from about 60% to about 98% by mole of repeating units of at least one phosphorylcholine-containing vinylic monomer, and (c) from about 1% by mole to about 20% by mole of acrylic monomeric units of at least one acrylic monomer having 3 to 16 carbon atoms, provided that the sum of the mole percentages of components (a), (b) and (c) and other components not listed above is 100%.

31. The soft contact lens of claim 30, wherein said at least one acrylic monomer is selected from the group consisting of a $C_1$-$C_{12}$ alkyl (meth)acrylate, a hydroxy-substituted $C_2$-$C_{12}$ alkyl (meth)acrylate, a carboxy-substituted $C_2$-$C_{12}$ alkyl (meth)acrylate, an $NH_2$-substituted $C_2$-$C_{12}$ alkyl (meth)acrylate, a methylamino-substituted $C_2$-$C_{12}$ alkyl (meth)acrylate, a dimethylamino-substituted $C_2$-$C_{12}$ alkyl (meth)acrylate, an ethylamino-substituted $C_2$-$C_{10}$ alkyl (meth)acrylate, a diethylamino-substituted $C_2$-$C_8$ alkyl (meth)acrylate, a $C_2$-$C_{12}$ alkyl (meth)acrylamide, a hydroxy-substituted $C_2$-$C_{12}$ alkyl (meth)acrylamide, a carboxy-substituted $C_2$-$C_{12}$ alkyl (meth)acrylamide, an $NH_2$-substituted $C_2$-$C_{12}$ alkyl (meth)acrylamide, a methylamino-substituted $C_2$-$C_{12}$ alkyl (meth)acrylamide, a dimethylamino-substituted $C_2$-$C_{12}$ alkyl (meth)acrylamide, an ethylamino-substituted $C_2$-$C_{10}$ alkyl (meth)acrylamide, a diethylamino-substituted $C_2$-$C_8$ alkyl (meth)acrylamide, ethylene glycol (meth)acrylate, di(ethylene glycol) (meth)acrylate, tri(ethylene glycol) (meth)acrylate, tetra(ethylene glycol) (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, and combinations thereof.

32. The soft contact lens of claim 30, wherein the phosphorylcholine-containing vinylic monomer is selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

* * * * *